(12) United States Patent
Krishnaswamy et al.

(10) Patent No.: US 11,386,012 B1
(45) Date of Patent: Jul. 12, 2022

(54) INCREASING ADDRESS SPACE LAYOUT RANDOMIZATION ENTROPY VIA PAGE REMAPPING AND ROTATIONS

(71) Applicant: QUALCOMM incorporated, San Diego, CA (US)

(72) Inventors: Arvind Krishnaswamy, San Jose, CA (US); Richard Senior, San Diego, CA (US); Sundeep Kushwaha, Round Rock, TX (US); Can Acar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/201,247

(22) Filed: Mar. 15, 2021

(51) Int. Cl.
*G06F 12/00* (2006.01)
*G06F 12/0882* (2016.01)
*G06F 12/0871* (2016.01)
*G06F 9/32* (2018.01)
*G06F 12/02* (2006.01)

(52) U.S. Cl.
CPC .......... *G06F 12/0882* (2013.01); *G06F 9/324* (2013.01); *G06F 12/0238* (2013.01); *G06F 12/0871* (2013.01); *G06F 2212/7201* (2013.01)

(58) Field of Classification Search
CPC .. G06F 12/0882; G06F 9/324; G06F 12/0238; G06F 12/0871; G06F 2212/7201
See application file for complete search history.

(56) References Cited

U.S. PATENT DOCUMENTS

2017/0024313 A1* 1/2017 Tsirkin .................... G06F 21/52
2020/0110884 A1* 4/2020 Austin .................. G06F 21/577

* cited by examiner

*Primary Examiner* — Gurtej Bansal
(74) *Attorney, Agent, or Firm* — The Marbury Law Group, PLLC

(57) ABSTRACT

Various embodiments include methods and devices for generating a memory map configured to map virtual addresses of pages to physical addresses, in which pages of a same size are grouped into regions. The embodiments may include adding a first entry for a first additional page to a first region in the memory map, shifting virtual addresses of the first region to accommodate a shift of virtual addresses of the first region allocated for code by a sub-page granular shift amount, mapping shifted virtual addresses of the first entry for the first additional page to physical address mapped to a first lowest shifted virtually addressed page of the first region, and shifting the virtual addresses of the first region allocated for code by a sub-page granular shift amount, in which the virtual addresses of the first region allocated for code partially shift into the first entry for the first additional page.

28 Claims, 12 Drawing Sheets

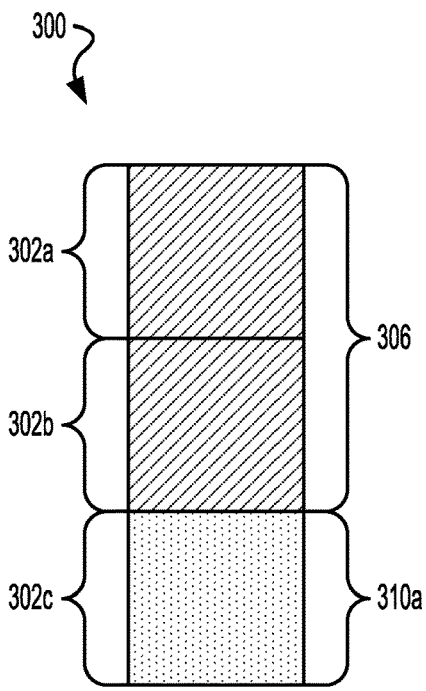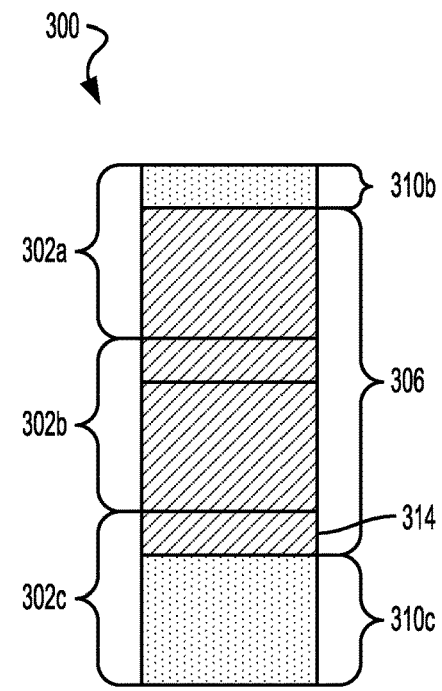
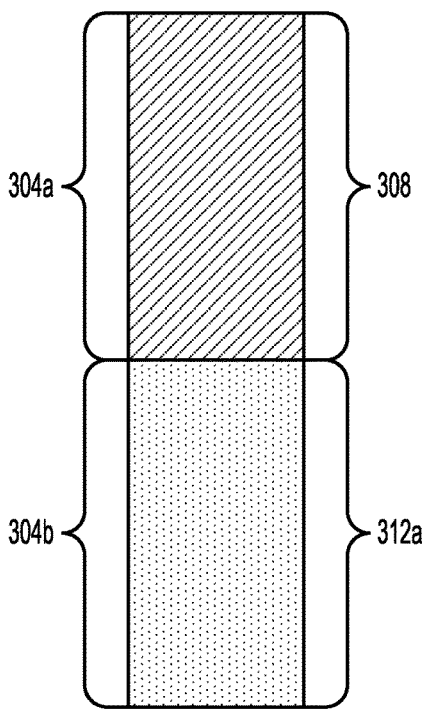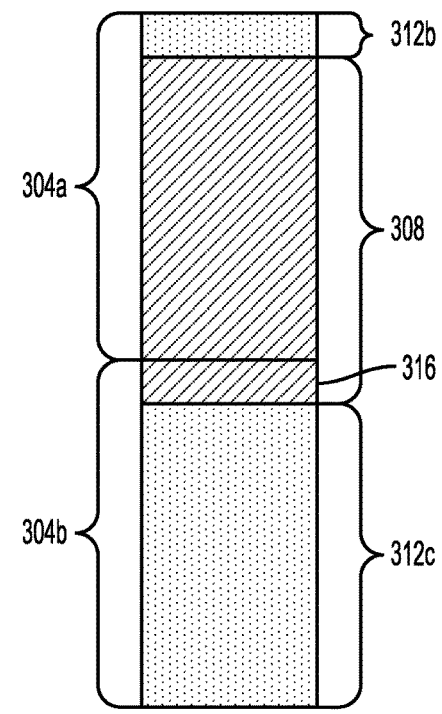
FIG. 3B　　　　　　　　FIG. 3C

400a

| Virtual Address | Physical Address | Page Size |
|---|---|---|
| 0-4 K | 0-4 K | 4 K |
| 4-8 K | 4-8 K | 4 K |
| 8-12 K | 8-12 K | 4 K |
| 12-16 K | 12-16 K | 4 K |
| 16-32 K | 16-32 K | 16 K |

| Virtual Address | Physical Address | Page Size |
|---|---|---|
| 8-12 K | 0-4 K | 4 K |
| 12-16 K | 4-8 K | 4 K |
| 16-20 K | 8-12 K | 4 K |
| 20-24 K | 12-16 K | 4 K |
| 24-28 K | 0-4 K | 4 K |
| 32-48 K | 16-32 K | 16 K |
| 48-64 K | 16-32 K | 16 K |

INCREASING ADDRESS SPACE LAYOUT RANDOMIZATION ENTROPY VIA PAGE REMAPPING AND ROTATIONS

BACKGROUND

Code reuse attacks are increasingly becoming a more common attack vector on systems where baseline countermeasures are implemented, such as W^X. Code reuse attacks reuse existing code in the binary for the attacker's purpose. One form of code reuse is when an attacker is able to invoke a function of their choice. For example, the attacker could use an overwrite vulnerability to modify the pointers in a function pointer table or jump table to a different function that is in the binary but not originally in the table. One common property of all code reuse attacks is that the attacker must have previous knowledge the address of the code or function in the binary to be able reuse it.

One way to defend against such attacks is via address space layout randomization (ASLR) of code segments of binaries. In this scheme, a loader will load a code segment of the binary at a random offset in the process' virtual address space on every load. As a result the code of interest for an attacker is now at a random address on each load. A measure of the effectiveness of ASLR is sometimes called entropy of ASLR. Various system factors can limit the entropy of ASLR.

SUMMARY

Various disclosed aspects may include apparatuses and methods of generating a memory map configured to map virtual addresses of pages to physical addresses, in which pages of a same size are grouped into regions. Various aspects may include adding a first entry for a first additional page to a first region in the memory map, shifting virtual addresses of the first region to accommodate a shift of virtual addresses of the first region allocated for code by a sub-page granular shift amount, mapping shifted virtual addresses of the first entry for the first additional page to physical address mapped to a first lowest shifted virtually addressed page of the first region, and shifting the virtual addresses of the first region allocated for code by a sub-page granular shift amount, in which the virtual addresses of the first region allocated for code partially shift into the first entry for the first additional page.

Some aspects may include adding a second entry for a second additional page to a second region in the memory map, in which the second region is virtually addressed higher than the first region, shifting virtual addresses of the second region to accommodate a shift of virtual addresses of the second region allocated for code by the sub-page granular shift amount, mapping shifted virtual addresses of the second entry for the second additional page to physical address mapped to a second lowest shifted virtually addressed page of the second region, and shifting the virtual addresses of the second region allocated for code by the sub-page granular shift amount, in which the virtual addresses of the second region allocated for code partially shift into the second entry for the second additional page.

Some aspects may include shifting the virtual addresses of the second region to accommodate the first entry added to the first region in the memory map, and shifting the virtual addresses of the second region to align the pages of the second region, including the second additional page, with page boundaries for a size page of the pages of the second region.

Some aspects may include rotating the code for the shifted virtual addresses of the first region allocated for code in a physical memory.

In some aspects, rotating the code for the shifted virtual addresses of the first region allocated for code in the physical memory may include loading code for the shifted virtual addresses of the first region allocated for code from the first lowest virtually addressed page to the mapped physical addresses, and loading code for the shifted virtual addresses of the first region allocated for code from the first additional page to the mapped physical addresses, in which the mapped physical addresses for the shifted virtual addresses of the first region allocated for code from the first additional page are lower physical addresses than the mapped physical addresses for the shifted virtual addresses of the first region allocated for code from the first lowest virtually addressed page.

Some aspects may include adjusting pointers for a binary code including the code by an amount of the shift of the virtual addresses of the second region to accommodate the shift of virtual addresses of the second region allocated for the code by the sub-page granular shift amount.

Some aspects may include generating program counter relative code, and generating the binary code from the program counter relative code Further aspects include a computing device having a processor configured to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIGS. 3A-3D are block diagrams illustrating an example of sub-page granular shift memory mapping and rotation suitable for implementing various embodiments.

FIGS. 4A and 4B are table diagrams illustrating an example of sub-page granular shift memory mapping and rotation suitable for implementing various embodiments.

DETAILED DESCRIPTION

Figure 1:
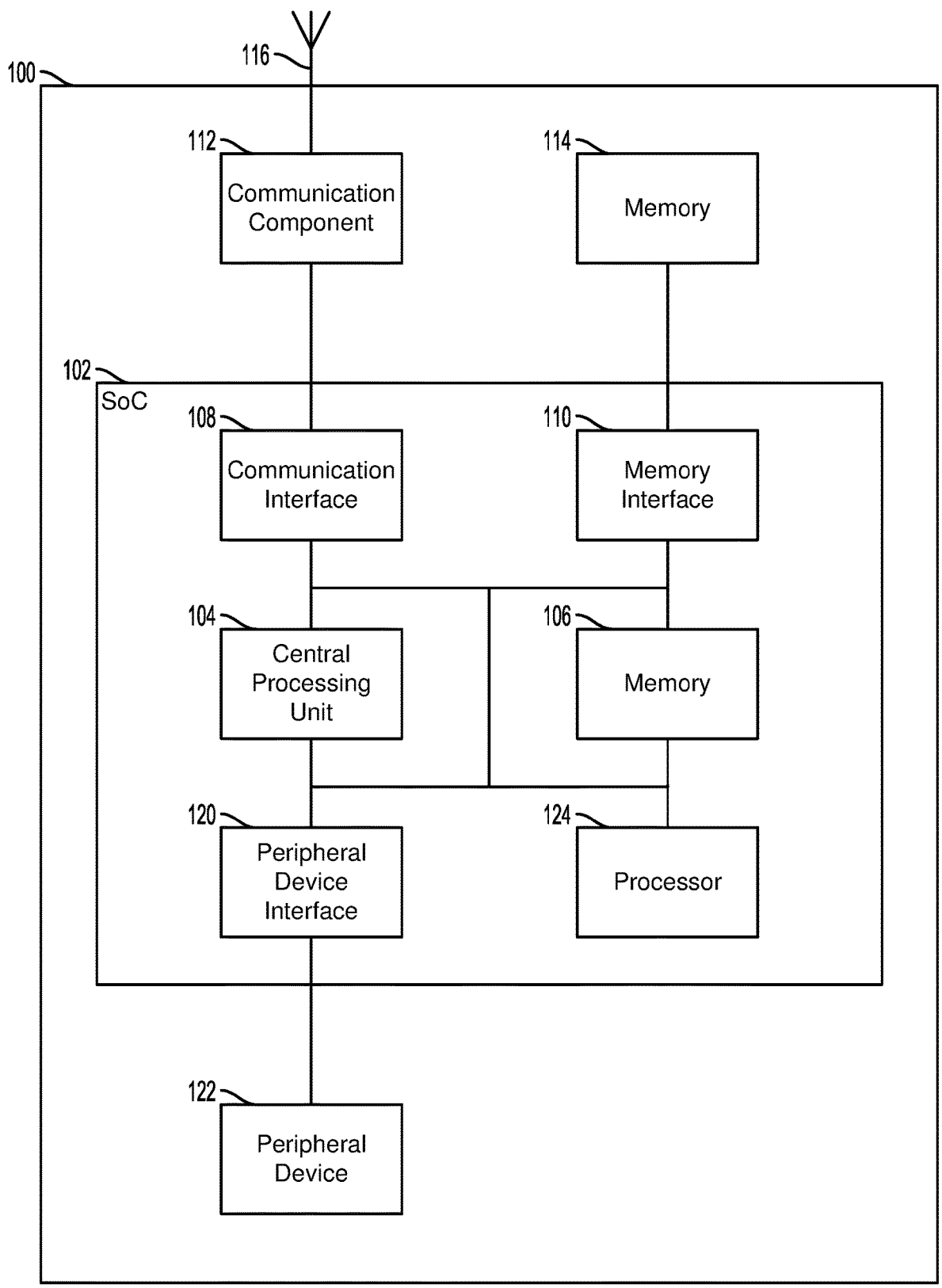
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of increasing address space layout randomization (ASLR) entropy via page remapping and rotation. Various embodiments may include generating a sub-page granular shift page map from a page map using a sub-page granular shift amount. In some embodiments, page virtual address ranges may be shifted to accommodate the sub-page granular shift amount and mapped to physical addresses of the page map. In some embodiments, page virtual address ranges of a region of pages may be shifted to align to page boundaries of a page size of the region. In some embodiments, an additional page map entry may be added for each region of pages of a same size. Some embodiments may include rotating code, data, and/or information stored to a physical memory based on the mapping of virtual addresses to physical addresses in the sub-page shift granular page map. In some embodiments, virtual address ranges for a first page entry and an added page entry of a region may be mapped to a same range of physical addresses.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers (such as in vehicles and other larger systems), servers, multimedia computers, and game consoles.

Various embodiments are described in terms of code, e.g., processor-executable instructions, for ease and clarity of explanation, but may be similarly applicable to any data, e.g., code, program data, or other information stored in memory. The terms "code", "data", and "information" are used interchangeably herein and are not intended to limit the scope of the claims and descriptions to the types of code, data, or information used as examples in describing various embodiments.

ASLR is a technique used to protect against malicious attacks, such as code reuse attacks. A measure of the effectiveness of ASLR is sometimes called entropy of ASLR. One way to interpret this measure would be an attacker's success rate if they were to make multiple code reuse attack attempts assuming a particular address. This could be multiple attempts on a particular device of interest or a broad attack over a population of devices. The higher the entropy of ASLR, the higher the number of attempts for a successful attack or the lower success rate for an attack.

The larger the number of locations where the loader can legally place the start of code, the harder it is for an attacker to exploit. Entropy that can be achieved in ASLR is usually largely limited by the amount of VA (virtual address) space available to the loader. Available entropy also has a close relationship to how virtual memory is managed via a memory management unit (MMU) and an operating system (OS), such as by using limited size translation lookaside buffers (TLB) or page tables, which can introduce significant constraints. There are systems which support multiple page sizes and where the memory map between virtual and physical addresses is statically determined. This introduces alignment restrictions that can further lower the available entropy.

Various embodiments provide ASLR schemes that may increase entropy by overcoming the limitations on entropy imposed by the foregoing memory, mapping, and alignment constraints. The ASLR schemes may include implementing sub-page granular shifts of virtual addresses in a virtual memory, corresponding code rotations in a physical memory, and mapping the modified virtual memory addresses to the addresses of the code in the physical memory.

A sub-page granular shift may be a shift of virtual addresses in a memory map configured to map virtual addresses of code in the virtual memory to the physical addresses of the physical memory. The term "memory map" is used herein to referrer to a data or memory structure configured to map the virtual addresses of the virtual memory to the physical addresses of the physical memory. For example, a memory map may include a TLB, a page table, an address array, a linked list, etc. In some embodiments, the memory map may map the virtual addresses of pages of the virtual memory of any number and combination of page sizes to the physical addresses of the physical memory representing correspondingly sized portions of the physical memory.

The sub-page granular shift may be a shift of the virtual addresses of code by any amount of virtual addresses that is not a multiple of a page size for the virtual memory. For example, a sub-page granular shift may be a shift of the virtual addresses in the virtual memory by any amount of virtual addresses that is not a multiple of a smallest page size for the virtual memory. As such, the sub-page granularly shifted virtual addresses of code may not align with a virtual address boundary for a page in the virtual memory. The sub-page granular shift of the virtual addresses of code may result in the virtual address shifted beyond a region of the memory map. The term "region" is used herein to refer to mappings of virtual addresses of pages of the same size in the memory map. A new entry for mapping virtual addresses of an additional page may be added to the memory map, such as to the region, to accommodate the virtual addresses of code that would be shifted beyond the region. The new entry may map virtual addresses of the additional page to physical addresses to which virtual addresses of a page of the same size are mapped. For example, the new entry may map the virtual addresses of the additional page to the physical addresses to which virtual addresses of a first page of the same region are mapped.

Memory maps may have multiple regions. Different regions may map virtual addresses of pages of different sizes to physical addresses. A sub-page granular shift, including an added entry to a first region may causes virtual addresses of pages of a second region to be misaligned with virtual address page boundaries for pages of a size for the second region. To align the virtual addresses of the pages of the second region to virtual addresses of page boundaries for the size pages, virtual address holes may be introduced to the memory map. Virtual address holes may be introduced by shifting the virtual addresses of the pages of the second region by an additional amount of virtual addresses to the sub-page granular shift amount of virtual addresses and the amount of virtual addresses any number and combination of added entries that may align the virtual addresses of the pages of the second region to virtual addresses of page boundaries for the size pages.

In some embodiments, the sub-page granular shift may leave memory map entries for virtual addresses of pages empty of code, and such entries may be omitted from the memory map. In some embodiments, virtual address holes may result in noncontiguous virtual addresses between regions, leaving some virtual addresses between regions unmapped. In either or both instances, a sub-page granular shift may need one entry per region to be added to the memory map. As such, growth of the memory map may be small compared to other ASLR schemes that may require more memory map entry additions.

Code of the virtual addresses of the additional entries to the memory map, added in response to the sub-page granular shift, may be rotated in the physical memory. As described above, the sub-page granular shift may cause the shifted virtual addresses of code to be misaligned with virtual addresses of page boundaries. As such, the sub-page granular shift may cause the mapping of the virtual addresses of code of a page to the physical addresses to be shifted by a same amount leaving corresponding empty portions of virtual addresses of the page and the physical addresses. The sub-page granular shift may also cause the mapping of the additional entry for a region in the memory, the virtual addresses of code of a page to the physical addresses of the additional entry, to be correspondingly misaligned with virtual addresses of page boundaries. The virtual addresses of the pages may be mapped to the same physical addresses, but the virtual addresses of the code in the pages may be mapped to different portions of the physical addresses. The virtual addresses of the code in the additional entry may be mapped to fill the empty portion of physical addresses caused by the sub-page granular shift. As such, when code is loaded, the code may be rotated in the physical memory, moving the code of the additional entry to the memory map from one end of a range of physical addresses, corresponding to a region in the memory map, to another end of the range of physical addresses.

In some embodiments, a linker may use the memory map as input and adjust code pointers accordingly. The code pointers may be adjusted to point to virtual addresses by the amount the virtual addresses are shifted in the memory map. In some embodiments, the code pointers may be adjusted by an amount of virtual addresses of the sub-page granular shift. In some embodiments, the code pointers may be adjusted by an amount of virtual addresses of the sub-page granular shift and an amount of virtual addresses of any number and combination of virtual address holes. Adjusting the code pointers may allow a loader to have flexibility for arbitrary code rotations in the physical memory without having to account for code changes or page alignments.

FIG. 1 illustrates a system including a computing device 100 suitable for use with various embodiments. The computing device 100 may include an SoC 102 with a central processing unit 104, a memory 106, a communication interface 108, a memory interface 110, a peripheral device interface 120, and a processing device 124. The computing device 100 may further include a communication component 112, such as a wired or wireless modem, a memory 114, an antenna 116 for establishing a wireless communication link, and/or a peripheral device 122. The processor 124 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors 124 and/or processor cores, such as a general purpose processor, a central processing unit (CPU) 104, a digital signal processor (DSP), a graphics processing unit (GPU), an accelerated processing unit (APU), a secure processing unit (SPU), an intellectual property unit (IPU), a subsystem processor of specific components of the computing device, such as an image processor for a camera subsystem or a display processor for a display, an auxiliary processor, a peripheral device processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more CPUs 104 and processors 124. The computing device 100 may include more than one SoC 102, thereby increasing the number of CPUs 104, processors 124, and processor cores. The computing device 100 may also include CPUs 104 and processors 124 that are not associated with an SoC 102. Individual CPUs 104 and processors 124 may be multicore processors. The CPUs 104 and processors 124 may each be configured for specific purposes that may be the same as or different from other CPUs 104 and processors 124 of the computing device 100. One or more of the CPUs 104, processors 124, and processor cores of the same or different configurations may be grouped together. A group of CPUs 104, processors 124, or processor cores may be referred to as a multiprocessor cluster.

The memory 106 of the SoC 102 may be a volatile or non-volatile memory configured for storing data and processor-executable code for access by the CPU 104, the processor 124, or other components of SoC 102. The computing device 100 and/or SoC 102 may include one or more memories 106 configured for various purposes. One or more memories 106 may include volatile memories such as random-access memory (RAM) or main memory, or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the CPU 104 and/or processor 124 and temporarily stored for future quick access without being stored in non-volatile memory. In some embodiments, any number and combination of memories 106 may include one-time programmable or read-only memory.

The memory 106 may be configured to store data and processor-executable code, at least temporarily, that is loaded to the memory 106 from another memory device, such as another memory 106 or memory 114, for access by one or more of the CPU 104, the processor 124, or other components of SoC 102. The data or processor-executable code loaded to the memory 106 may be loaded in response to execution of a function by the CPU 104, the processor 124, or other components of SoC 102. Loading the data or processor-executable code to the memory 106 in response to execution of a function may result from a memory access request to the memory 106 that is unsuccessful, or a "miss," because the requested data or processor-executable code is not located in the memory 106. In response to a miss, a memory access request to another memory 106 or memory 114 may be made to load the requested data or processor-executable code from the other memory 106 or memory 114 to the memory 106. Loading the data or processor-executable code to the memory 106 in response to execution of a function may result from a memory access request to another memory 106 or memory 114, and the data or processor-executable code may be loaded to the memory 106 for later access.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106 in which the memory 114 may store the data or processor-executable code for access by one or more of the CPU 104, the processor 124, or other components of SoC 102. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the CPU 104, the processor 124, or other components of the SoC 12 to read data from and write data to the memory 114.

Some or all of the components of the computing device 100 and/or the SoC 102 may be arranged differently and/or combined while still serving the functions of the various embodiments. The computing device 100 may not be limited to one of each of the components, and multiple instances of each component may be included in various configurations of the computing device 100.

Figure 2:
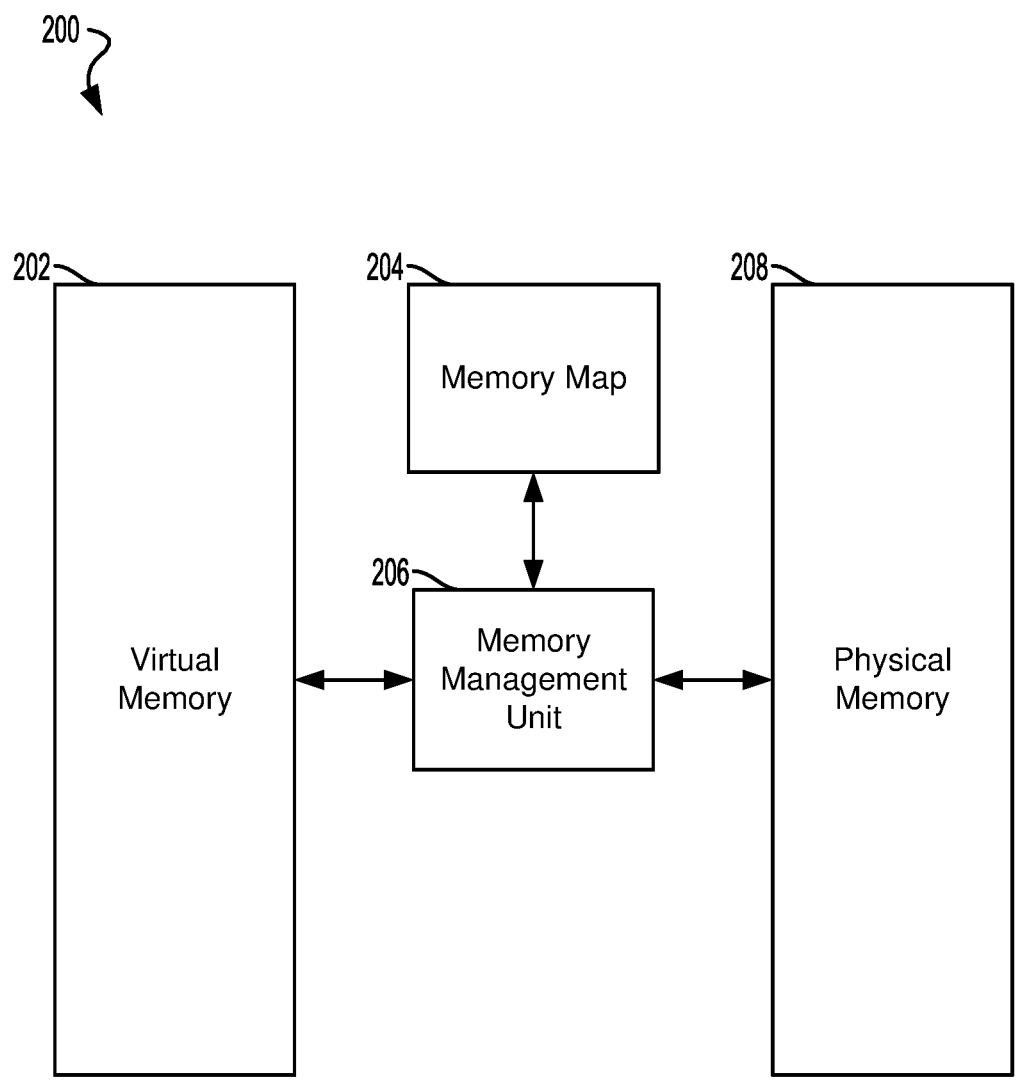
FIG. 2 is a component block diagram illustrating example memory system suitable for implementing various embodiments.

FIG. 2 illustrates components of a memory system 200 of a computing device (e.g., computing device 100 in FIG. 1) suitable for implementing some embodiments. With reference to FIGS. 1 and 2, the memory system 200 may include components configured to implement a virtual memory 202 (e.g., on SoC 102, CPU 104, processor 124), a memory map 204 (e.g., on SoC 102, CPU 104, processor 124), a memory management unit (MMU) 206 (e.g., on SoC 102, CPU 104, processor 124), and a physical memory 208 (e.g., memory 106).

The memory management unit 206 may be configured to manage access to the physical memory 208 by a processor (e.g., CPU 104, processor 124) for implementation of a memory access request, such as a read and/or write memory access request. The processor may implement the virtual memory 202 and execute code based on virtual addresses of the virtual memory 202. The processor may issue memory access requests to the physical memory 208 based on the virtual addresses of the virtual memory 202. To implement the memory access requests, the physical memory 208 may require physical addresses of the physical memory 208 to identify locations of the physical memory 208 at which to implement the memory access requests. The virtual addresses and the physical addresses may not be the same, and the virtual addresses may need to be translated to physical addresses for the physical memory 208 to implement the memory access requests. Additionally, the processor may require any return from the physical memory 208 for the implementation of memory access requests to indicate virtual memory addresses. The physical addresses used by the physical memory 208 may need to be translated to virtual addresses for the processor to accept returns of the memory access requests.

The memory management unit 206 may generate and/or maintain a memory map 204 configured to map the virtual addresses of the virtual memory 202 to the physical addresses of the physical memory 206, as further described herein. The memory management unit 206 may use the memory map 204 to translate between the virtual addresses and the physical addresses to allow for implementation of the memory access requests by the physical memory 208 and acceptance of returns of the memory access requests by the processor.

Additionally, the memory management unit 206 may be configured to implement ASLR schemes that may increase ASLR entropy via page remapping and rotation, as described further herein. In some embodiments, the memory management unit 206 may shift virtual addresses in the memory map 204 by a sub-page granular shift amount and add and/or omit entries in the memory map 204 mapping virtual addresses to physical addresses. In some embodiments, the memory management unit 206 may shift virtual addresses in the memory map 204 to align virtual addresses of pages to page boundaries, for any number and combination of page sizes.

FIGS. 3A-3D illustrate an example of sub-page granular shift memory mapping and rotation suitable for implementing various embodiments. With reference to FIGS. 1-3D, sub-page granular shift memory mapping and rotation may be implemented on a computing device (e.g., computing device 100 in FIG. 1) via a memory system (e.g., memory system 200) for a virtual memory 300 (e.g., on SoC 102, CPU 104, processor 124 in FIG. 1, a virtual memory 202 in FIG. 2) and a physical memory 320 (e.g., memory 106 in FIG. 1, physical memory 208 in FIG. 2).

The virtual memory 300 may include any number and combination of pages 302a, 302b, 302c, 304a, 304b of any number and combination of page sizes. Virtual addresses of the pages 302a, 302b, 302c, 304a, 304b may be allocated to code 306, 308 of any number and combination of code size.

The physical memory 320 may include ranges of physical addresses 326a, 326b, 328a mapped to the pages 302a, 302b, 302c, 304a, 304b of the virtual memory 300. The code 306, 308 for which the virtual address are allocated may be loaded to and stored on the physical memory 320 within the ranges of physical addresses 326a, 326b, 328a.

Figure 3A:
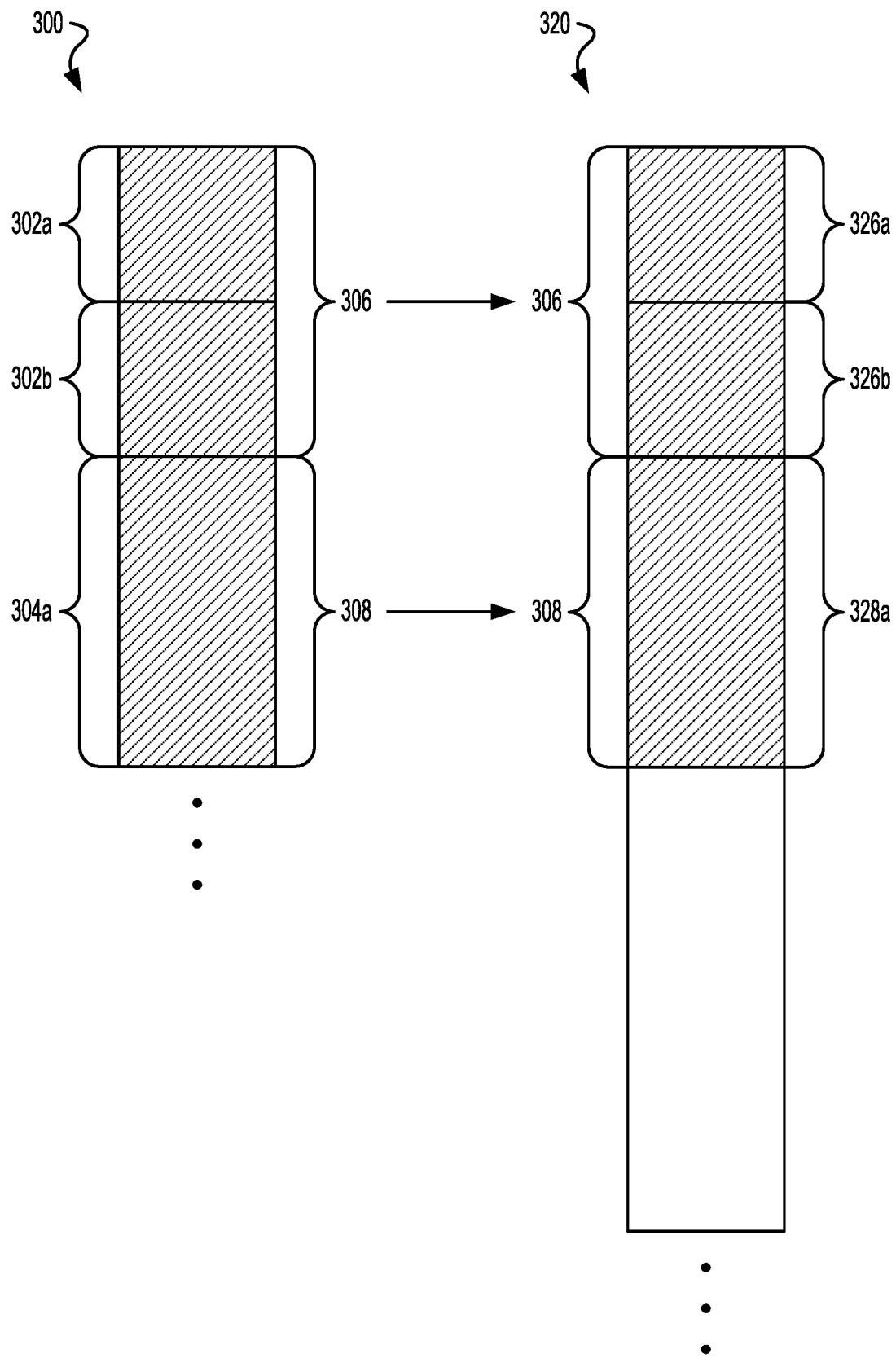

FIG. 3A illustrates an example mapping of the virtual memory 300 and the physical memory 320 prior to implementing sub-page granular shift memory mapping and rotation. The virtual addresses allocated for the code 306, 308 may reside within the pages 302a. 302b, 304a of the virtual memory 300. For example, the virtual addresses allocated for the code 306 may reside within the pages 302a, 302b. The virtual addresses allocated for the code 308 may reside within the page 304a. Any portion and combination of the virtual addresses of the pages 302a, 302b, 304a may allocated for the code 306, 308.

The virtual addresses of the pages 302a, 302b, 304a may be mapped to the physical addresses residing within the ranges of physical addresses 326a, 326b, 328a. The code 306, 308 for which the virtual addresses are allocated may be to and stored on the physical memory 320 at the physical addressed within the ranges of physical addresses 326a, 326b. 328a mapped to the virtual addresses. For example, the virtual addresses of the page 302a may be mapped to the physical addresses of the range of physical addresses 326a. A portion of the code 306 for which the virtual addresses of the page 302a may be allocated may be loaded to and stored at the physical addresses of the range of physical addresses 326a. The virtual addresses of the page 302b may be mapped to the physical addresses of the range of physical addresses 326b. A portion of the code 306 for which the virtual addresses of the page 302b may be allocated may be loaded to and stored at the physical addresses of the range of physical addresses 326b. The virtual addresses of the page 304a may be mapped to the physical addresses of the range of physical addresses 328a. The code 308 for which the virtual addresses of the page 304a may be allocated may be loaded to and stored at the physical addresses of the range of physical addresses 328a. The code 306, 308 may be loaded to and stored at any portion and combination of the physical addresses of the ranges of physical addresses 326a, 326b, 328a.

FIG. 3B illustrates an example of the virtual memory 300 during implementation of sub-page granular shift memory mapping and rotation. A sub-page granular shift may shift the virtual addresses that are allocated for the code 306, 308 by a sub-page granular shift amount of virtual addresses that is not a multiple of a page size for the virtual memory 300. For example, a sub-page granular shift may be a shift of the virtual addresses in the virtual memory 300 by any amount of virtual addresses that is not a multiple of a smallest page size for the virtual memory. For example, the amount of virtual addresses of the sub-page granular shift may be larger than or smaller than a page. As such, the sub-page granularly shifted virtual addresses allocated for the code 306, 308 may not align with a virtual address boundary for the pages 302a, 302b, 304a in the virtual memory 300.

The sub-page granular shift may shift the virtual addresses that are allocated for the code 306, 308 beyond the bounds of the pages 302a, 302b, 304a. For a lowest addressed region of pages, a page of the same size as and contiguous to the pages of the region, may be allocated to accommodate the virtual addresses shifted beyond the bounds of the pages. For example, for a region containing the pages 302a, 302b, a page 302c, the same size as and contiguous to the pages 302a, 302b, may be allocated to accommodate the virtual addresses shifted beyond the bounds of the pages 302a. 302b. In some embodiments, for which the virtual addresses allocated for the code 306 are shifted completely beyond any of the pages 302a, 302b, 302c the virtual addresses of the pages 302a, 302b. 302c may be correspondingly shifted while maintaining alignment with boundaries for the pages. In some embodiments, the virtual addresses of the pages 302a, 302b, 302c may be shifted by an amount of virtual addresses equal to a closest multiple of the page size that is less than the sub-page granular shift amount of virtual addresses. The page 302c may be allocated so that the shifted virtual addresses allocated for the code 306 may be encompassed by the pages 302a, 302b, 302c. In some embodiments, the page 302c may be allocated prior to assignment of the code 306 to the allocated virtual addresses of the page 302c, and may contain empty address space 310a.

A higher addressed region of pages may have different sized pages from the lower addressed region. Similarly, to the lower addressed region of pages, for the higher addressed region of pages, a page of the same size as and contiguous to the pages of the region, may be allocated to accommodate the virtual addresses shifted beyond the bounds of the pages. For example, for the region containing the page 304a, a page 304b, the same size as and contiguous to the page 304a may be allocated to accommodate the virtual addresses shifted beyond the bounds of the page 304a. In some embodiments, the page 304b may be allocated prior to assignment of the code 308 to the Similarly, virtual addresses of the page 304b, and may contain empty address space 312a.

In some embodiments, the shift of the virtual addresses of the pages of the lower addressed region, may also be applied to the virtual addresses of the pages of the higher addressed region. In some embodiments, the shift of the virtual address of the pages of the higher addressed region may include an amount of virtual addresses to account for the addition of a page to the lower addressed region. The shift may cause virtual addresses of the pages of the higher addressed region to be misaligned with virtual address page boundaries for pages of the size for the higher addressed region. To align the virtual addresses of the pages of the higher addressed region to virtual addresses of page boundaries for the size pages, virtual address holes may be introduced to the virtual memory 300. Virtual address holes may be introduced by shifting the virtual addresses of the pages of the higher addressed region by an additional amount of virtual addresses that may align the virtual addresses of the pages of the higher addressed region to virtual addresses of page boundaries for the size pages. The additional amount of virtual addresses may be in addition to the shift amount of virtual addresses of the pages and/or the amount of virtual addresses of the added page of the lower addressed region. For example, the page 304a may be a region unto itself and may be sized larger than each of the pages 302a, 302b. The page 304b may be added to the higher addressed region having page 304a. The virtual addresses of the region containing the pages 304a, 304b may be shifted by the amount the virtual addresses of the pages of the lower addressed region are shifted. The virtual addresses of the region containing the page 304a, 304b may be shifted to accommodate the addition of another page. However, any construction of the shift may misalign the pages 304a, 304b with page boundaries for the size page of the pages 304a, 304b. To align the pages 304a. 304b with page boundaries for the size page of the pages 304a. 304b, the virtual addresses of the region containing the pages 304a, 304b may be shifted by an additional amount that may align the pages 304a, 304b with page boundaries for the size page of the pages 304a, 304b.

FIG. 3C illustrates an example of the virtual memory 300 during implementation of sub-page granular shift memory mapping and rotation. The sub-page granular shift may shift the virtual addresses that are allocated for the code 306, 308 by a sub-page granular shift amount of virtual addresses. The sub-page granular shift amount of virtual addresses may be the same for every region of the virtual memory 300. For the lowest addressed region pages, the virtual addresses of the pages may be shifted by the sub-page granular shift amount of virtual addresses. For example, the virtual addresses of the region having the pages 302a. 302b may be shifted by the sub-page granular shift amount of virtual addresses such that the virtual addresses assigned the code 306 may span the pages 302a, 302b. 302c, assigning a portion of the code 306, code 314, to the added page 302c. The sub-page granular shift may create empty address space 310b at the lowest addresses of the region in the page 302a and reduce the amount of empty address space 310c at the highest addresses of the region in the page 302c by the sub-page granular shift amount of virtual addresses.

For the higher addressed region of pages, the virtual addresses of the pages, shifted to accommodate lower addressed added pages, such as the page 302c, and to align the virtual addresses of the pages of the higher addressed region to virtual addresses of page boundaries for the size pages, may be shifted by the sub-page granular shift amount of virtual addresses. For example, the virtual addresses of the region having the page 304a, as described with reference to FIG. 3B, may be shifted by the sub-page granular shift amount of virtual addresses such that the virtual addresses assigned the code 308 may span the pages 304a. 304b, assigning a portion of the code 308, code 316, to the added page 304b. The sub-page granular shift may create empty address space 312b at the lowest addresses of the region in the page 304a and reduce the amount of empty address space 312c at the highest addresses of the region in the page 304b by the sub-page granular shift amount of virtual addresses.

Figure 3D:
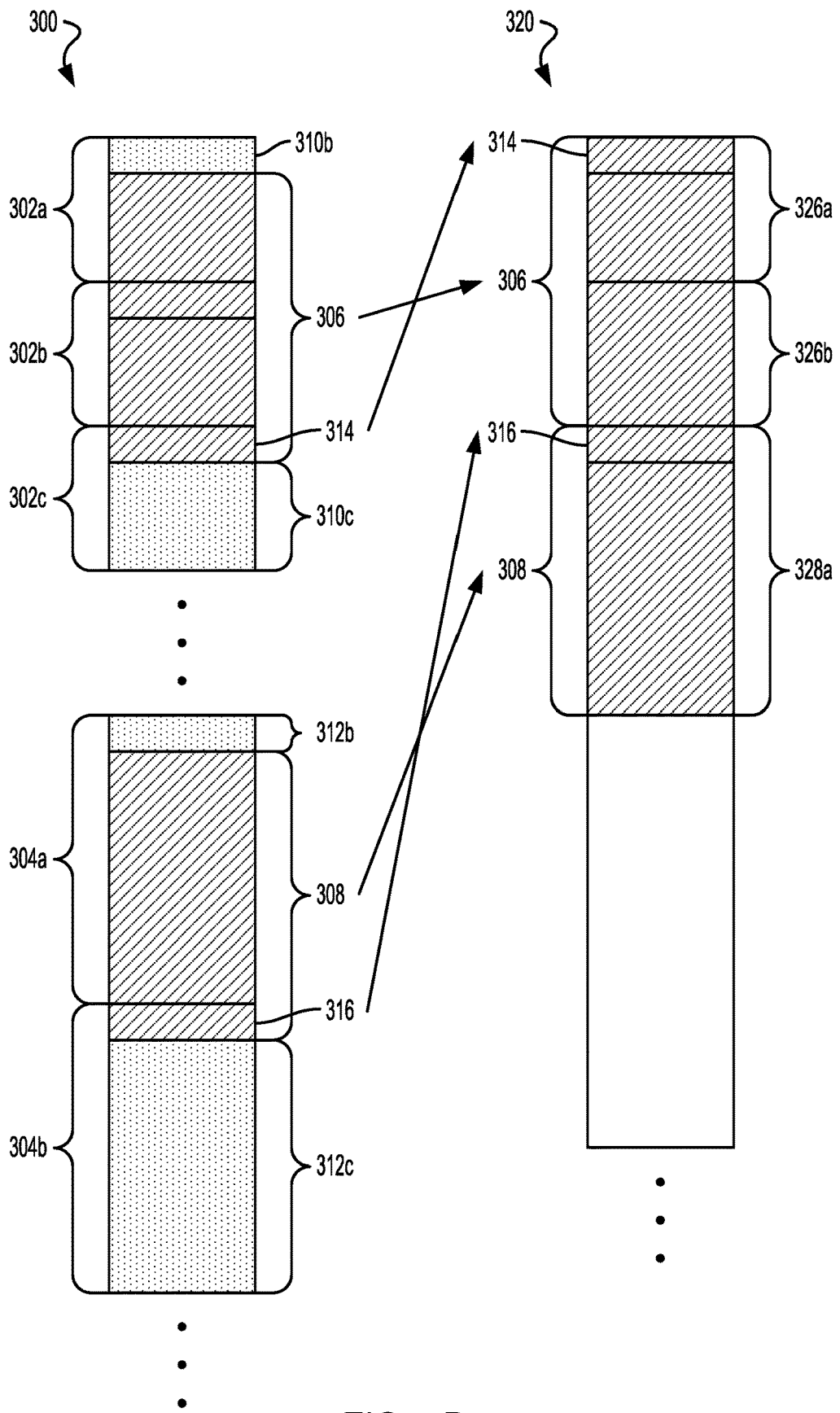

FIG. 3D illustrates an example of the virtual memory 300 and physical memory 320 during implementation of sub-page granular shift memory mapping and rotation. The sub-page granularly shifted virtual addresses of the virtual memory 300 may be remapped to the physical addresses of the physical memory 320. The original pages 302a, 302b, 304a, regardless of whether their virtual addresses are shifted, may be mapped to the same ranges of physical addresses 326a, 326b, 328a, as before implementing the sub-page granular shift. The added pages 302c, 304b may be mapped to the same ranges of physical addresses 326a, 328a, as a lowest addressed page 302a, 304a of the same region.

The shifted virtual addresses of the code 306, 308 may be mapped such that a rotation of the code is implemented in the physical memory 320. The shifted virtual addresses of the code 306, 308 may be mapped such that the physical addresses of the code 306, 308 are shifted by a same amount of addresses as the virtual addresses of the code 306, 308 are shifted within the original pages 302a, 302b, 304a. The shifted virtual addresses of the code 314, 316 may be mapped such that the physical addresses of the code 314, 316 fill an empty portion of the ranges of physical addresses 326a, 326b, 328a created by shifting the physical addresses of the code 306, 308 by the same amount of addresses as the virtual addresses of the code 306, 308 are shifted within the original pages 302a, 302b, 304a. As such, the code 314, 316 are rotated to be loaded to and stored on the physical memory 320 at lower addresses in the number ranges of physical addresses 326a. 326b, 328a than the higher addresses in the ranges of physical addresses 326a, 326b, 328a to which the code 314, 316 would be stored at without implementation of sub-page granular shift memory mapping and rotation.

The examples illustrated in FIGS. 3A-3D are used for clarity and ease of explanation, and do not illustrate every possible embodiment. These examples do not limit the scope of the claims and the specification. The examples do not limit the number and size of regions, number and size of pages, amount of code allocated to any number and combination of pages, such as fully and partially allocated pages, the number and size of ranges of physical addresses, the size of the sub-page granular shift, etc.

FIGS. 4A and 4B illustrate an example of sub-page granular shift memory mapping and rotation suitable for implementing various embodiments. With reference to FIGS. 1-4B, sub-page granular shift memory mapping and rotation may be implemented on a computing device (e.g., computing device 100 in FIG. 1) via a memory system (e.g., memory system 200) using any number and combination of memory maps 400a, 400b (e.g., memory map 204 in FIG. 2). FIG. 4A illustrates an example memory map 400a showing a memory map prior to implementing sub-page granular shift memory mapping. FIG. 4B illustrates an example memory map 400b showing a memory map implementing sub-page granular shift memory mapping.

The memory map 400a may include two regions pages, a lowest addressed region of pages and a higher addressed region of pages. The lowest addressed region of pages may include four pages of size 4 K each. The higher addressed region of pages may include one page of size 16 K. Each of the pages may include virtual addresses that correspond to the page size and the page, such that the virtual addresses of different pages do not overlap. The virtual addresses of all of the pages may be contiguous. The virtual addresses of the pages may be mapped to corresponding ranges of physical addresses of the same size as the page. In other words, the 4 K sized pages may be mapped to 4 K sized ranges of physical addresses, and the 16 K sized page may be mapped to a 16 K sized range of physical addresses.

The memory map 400b may be generated from the memory map 400a by implementing number sub-page granular shift memory mapping. In the example illustrated in FIG. 4B, the memory map 400b may be generated using a sub-page granular shift of a size greater than 8 K and less than 12 K virtual addresses, such as 10 K virtual addresses.

To accommodate the 10 K virtual address sub-page granular shift, a 4 K sized page may be added to the lowest addressed region of pages. This additional page may encompass virtual addresses shifted beyond the bounds of the original four pages of the lowest addressed region of pages. A 16 K sized page may be added to the higher addressed region of pages. This additional page may encompass virtual addresses shifted beyond the bounds of the original one page of the higher addressed region of pages.

The virtual addresses of the 4 K sized pages of the lowest addressed region of pages may be shifted to encompass all of the virtual addresses of the original 4 K sized pages shifted by the 10 K virtual address sub-page granular shift, while still aligning with 4 K sized page boundaries. For example, an 8 K virtual address shift would allow the five 4 K sized pages of the lowest addressed region of pages to encompass number all of the virtual addresses of the original 4 K sized pages shifted by the 10 K virtual address sub-page granular shift, while still aligning with 4 K sized page boundaries.

The virtual addresses of the 16 K sized pages of the higher addressed region of pages may be shifted to encompass all of the virtual addresses of the original 16 K sized page shifted by the 10 K virtual address sub-page granular shift, while not overlapping the lowest addressed region of pages and still aligning with 16 K sized page boundaries. For example, the 8 K virtual address shift would allow the two 16 K sized pages of the lowest addressed region of pages to encompass number all of the virtual addresses of the original 16 K sized page shifted by the 10 K virtual address sub-page granular shift. However, the 8 K virtual address shift would be insufficient to avoid overlapping the lowest addressed region of pages because of the added fifth page of the lowest addressed region of pages. Therefore, a virtual address shift of the virtual address of the higher addressed region of pages may additionally include the size of the added fifth page of the lowest addressed region of pages, 4 K virtual addresses. However, a 12 K virtual address shift (8 K+4 K), may not align the two 16 K pages of the higher addressed region of pages with 16 K page boundaries. Therefore, a virtual address shift of the virtual address of the higher addressed region of pages may additionally include an amount of virtual addresses to align the pages of the higher addressed region of pages with the page boundaries for the page size. The virtual address shift of the virtual address of the higher addressed region of pages may be 16 K (8 K+4 K+4 K), to number encompass all of the virtual addresses of the original 16 K sized page shifted by the 10 K virtual address sub-page granular shift, while not overlapping the lowest addressed region of pages and still aligning with 16 K sized page boundaries.

The shifted virtual addresses of the original pages of the regions may be mapped to the same ranges of physical addresses as prior to being shifted. The added 4 K page may be mapped to the same range of physical addresses as the lowest addressed page of the region of 4 K sized pages. The added 16 K page may be mapped to the same range of physical addresses as the lowest addressed page of the region of 16 K sized pages.

The examples illustrated in FIGS. 4A and 4B are used for clarity and ease of explanation, and do not illustrate every possible embodiment. These examples are not intended to limit the scope of the claims and the specification. The examples do not limit the number and size of regions, number and size of pages, amount of code allocated to any number and combination of pages, such as fully and partially allocated pages, the number and size of ranges of physical addresses, the size of the sub-page granular shift, etc.

Figure 5:
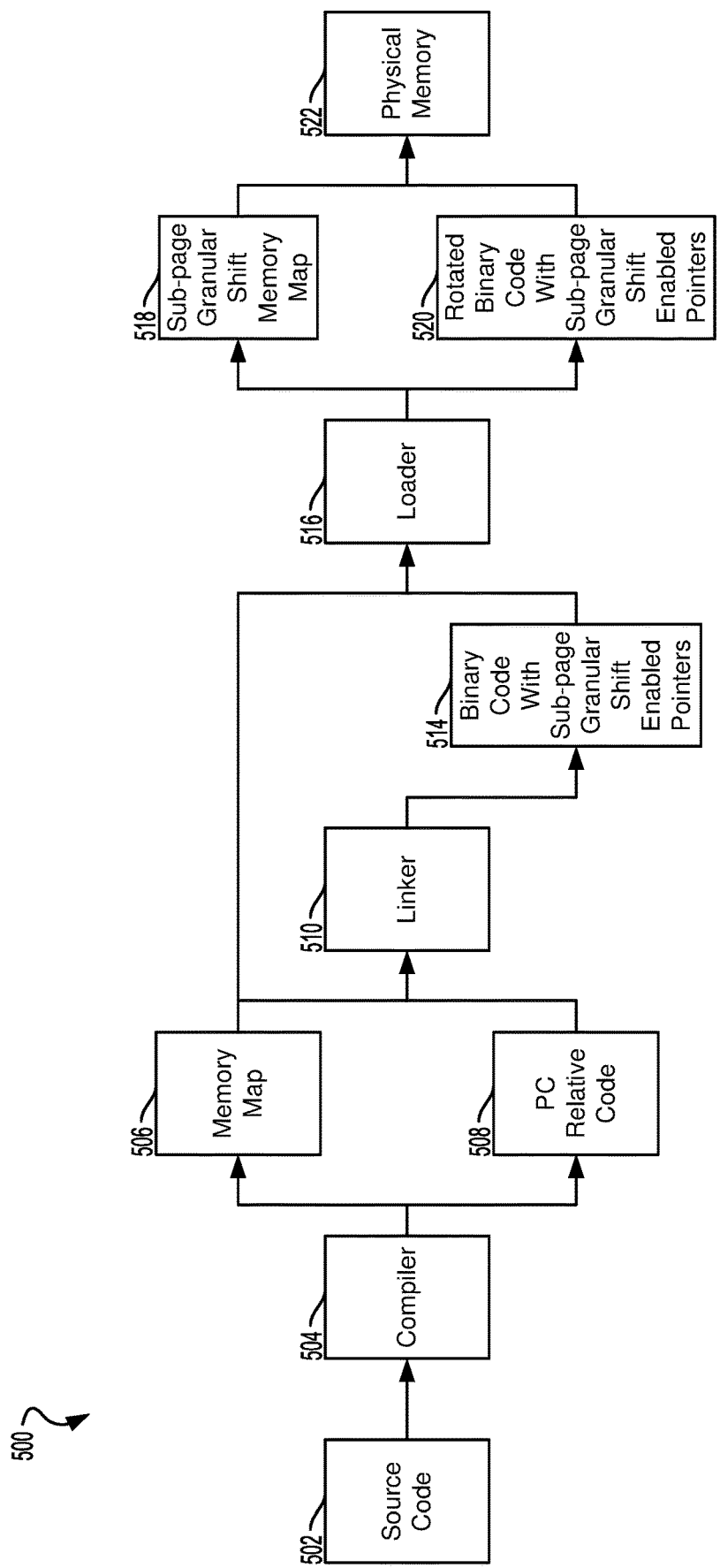
FIG. 5 is a component block and flow diagram illustrating an example of sub-page granular shift memory mapping and rotation suitable for implementing various embodiments.

FIG. 5 illustrates an example of sub-page granular shift memory mapping and rotation system 500 flow suitable for implementing various embodiments. With reference to FIGS. 1-5, the sub-page granular shift memory mapping and rotation system 500 may be implemented on a computing device (e.g., computing device 100) by a processor (e.g., CPU 104, processor 124) executing a compiler 504, a linker 510, and a loader 516, and a physical memory.

A source code 502 may be received by the sub-page granular shift memory mapping and rotation system 500. The compiler may generate program counter (PC) relative code 508 from the source code 502. The compiler 504 may also generate a memory map 506 (e.g., memory map 204, memory 400b). The memory map 506 may be configured to map virtual addresses of a virtual memory (e.g., virtual memory 202 in FIG. 2, virtual memory 300) and physical addresses of a physical memory 522 (e.g., memory 106, physical memory 208, physical memory 320). The memory map 506 may be generated in a manner to accommodate a sub-page granular shift memory mapping. For example, the memory map 506 may be generated adding an extra entry (e.g., mapping of virtual addresses of a page to physical addresses) per region of the memory map 506 as compared to a memory map (e.g., memory map 400a) generally used for executing the PC relative code 508. For another example, virtual addresses of pages of the regions may be shifted to add the extra entry per region and may become misaligned with page boundaries of the corresponding size pages. The memory map 506 may be generated, shifting any number and combination of virtual addresses of pages of the regions to align pages of the regions to page boundaries for the size pages of the regions.

The linker 510 may receive the memory map 506 and the PC relative code 508 as inputs. The linker 510 may use the shifts in the virtual addresses from the memory map 506 and the PC relative code 508 to generate binary code with sub-page granular shift adjusted pointers 514. The linker may adjust PC relative offsets using the region specific shifts of the memory map 506 to correctly link between PC relative instructions. The linker can convert the adjusted PC relative code to binary code with sub-page granular shift enabled pointers 514, which may be configured to function regardless of a value of the sub-page granular shift amount of virtual addresses applied to the virtual addresses of the memory map 506.

The loader 516 may receive the memory map 506 and the binary code with sub-page granular shift enabled pointers 514 as inputs. The loader 516 may apply a sub-page granular shift to the virtual addresses of the memory map 506. In some embodiments, the sub-page granular shift may be predetermined or algorithmically derived, such as by a random generator algorithm. The sub-page granular shift to the virtual addresses of the memory map 506 may shift the virtual addresses of the memory map 506 by a sub-page granular shift amount of virtual addresses, generating a sub-page granular shift memory map 518 (e.g., memory map 204, memory 400b). The loader 516 may retrieve code from a memory (e.g., memory 106, 114) required for execution of the binary code with sub-page granular shift enabled pointers 514. The loader 516 may use the sub-page granular shift memory map 518 to load and store the code to the physical memory 522. For example, the loader 516 may implement the sub-page granular shift memory rotation of the code in the physical memory 522 according to the virtual memory to physical memory mapping of the sub-page granular shift memory map 518. The loader may shift and rotate the code retrieved from the memory, generating rotated binary code with sub-page granular shift enabled pointers 520. The loader 516 may load and store the rotated binary code with sub-page granular shift enabled pointers 520 to the physical memory 522.

Figure 6:
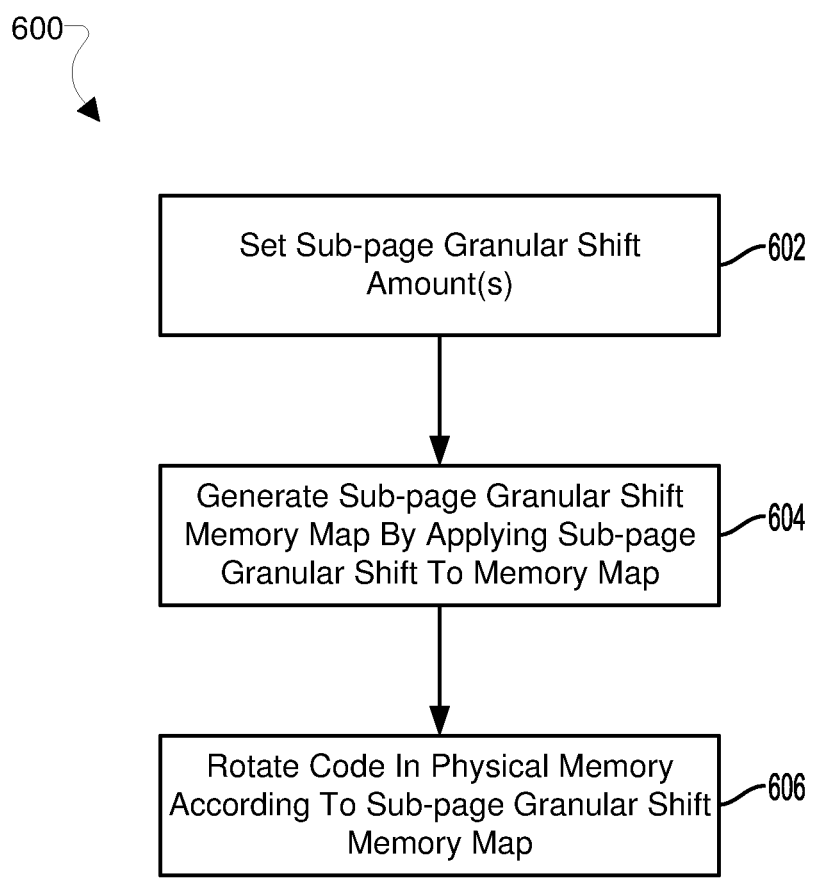
FIG. 6 is a process flow diagram illustrating a method for sub-page granular shift memory mapping according to an embodiment.

FIG. 6 illustrates a method 600 for sub-page granular shift memory mapping according to an embodiment. With reference to FIGS. 1-6, the method 600 may be implemented in a computing device (e.g., computing device 100), in hardware (e.g., SoC 102. CPU 104, memory 106, processor 124, memory management unit 206), in software executing in a processor (e.g., memory management unit 206, compiler 504, linker 510, loader 516), or in a combination of a software-configured processor and dedicated hardware (e.g., memory system 200, memory management unit 206, sub-page granular shift memory mapping and rotation system 500) that includes other individual components, and various memory/cache controllers. In order to encompass the alternative configurations enabled in various embodiments, the hardware implementing the method 600 is referred to herein as an "memory control device."

In block 602, the memory control device may set a sub-page granular shift amount(s). In some embodiments any number and combination of sub-page granular shift amounts may be predetermined or algorithmically derived, such as by a random generator algorithm. In some embodiments, a sub-page granular shift amount may be an amount of virtual address space or virtual addresses of a virtual memory (e.g., virtual memory 202, virtual memory 300). In some embodiments, the memory control device setting the sub-page granular shift amount(s) in block 602 may be a processor, a CPU, a memory management unit, and/or a loader.

In block 604, the memory control device may generate a sub-page granular shift memory map (e.g., memory map 204, e.g., memory map 400*b*, sub-page granular shift memory map 518). The memory control device may apply a sub-page granular shift to a memory map (e.g., memory map 400*b*, memory map 506). Applying the sub-page granular shift to the memory map may shift virtual addresses assigned to code in the memory map by the sub-page granular shift amount. The memory map to which the sub-page granular shift is applied may be a memory map generated in the method 700 as described with reference to FIG. 7. In some embodiments, the memory control device generating the sub-page granular shift memory map in block 604 may be a processor, a CPU, a memory management unit, and/or a loader.

In block 606, the memory control device may rotate code (e.g., code 306, 308, 314, 316) in the physical memory (e.g., memory 106, physical memory 208, physical memory 320, physical memory 522) according to the sub-page granular shift memory map. The memory control device may rotate code in the physical memory by loading and storing code retrieved from a memory (e.g., memory 106, 114) according to an execution of a code (e.g., binary code with sub-page granular shift enabled pointers 514) to the physical memory. The code retrieved from the memory may be loaded and stored to the physical memory according to mappings of the sub-page granular shift to the memory map in the method 900 as described further with reference to FIG. 9. In some embodiments, the memory control device rotating the code in the physical memory according to the sub-page granular shift memory map in block 606 may be a processor, a CPU, a memory management unit, and/or a loader.

Figure 7:
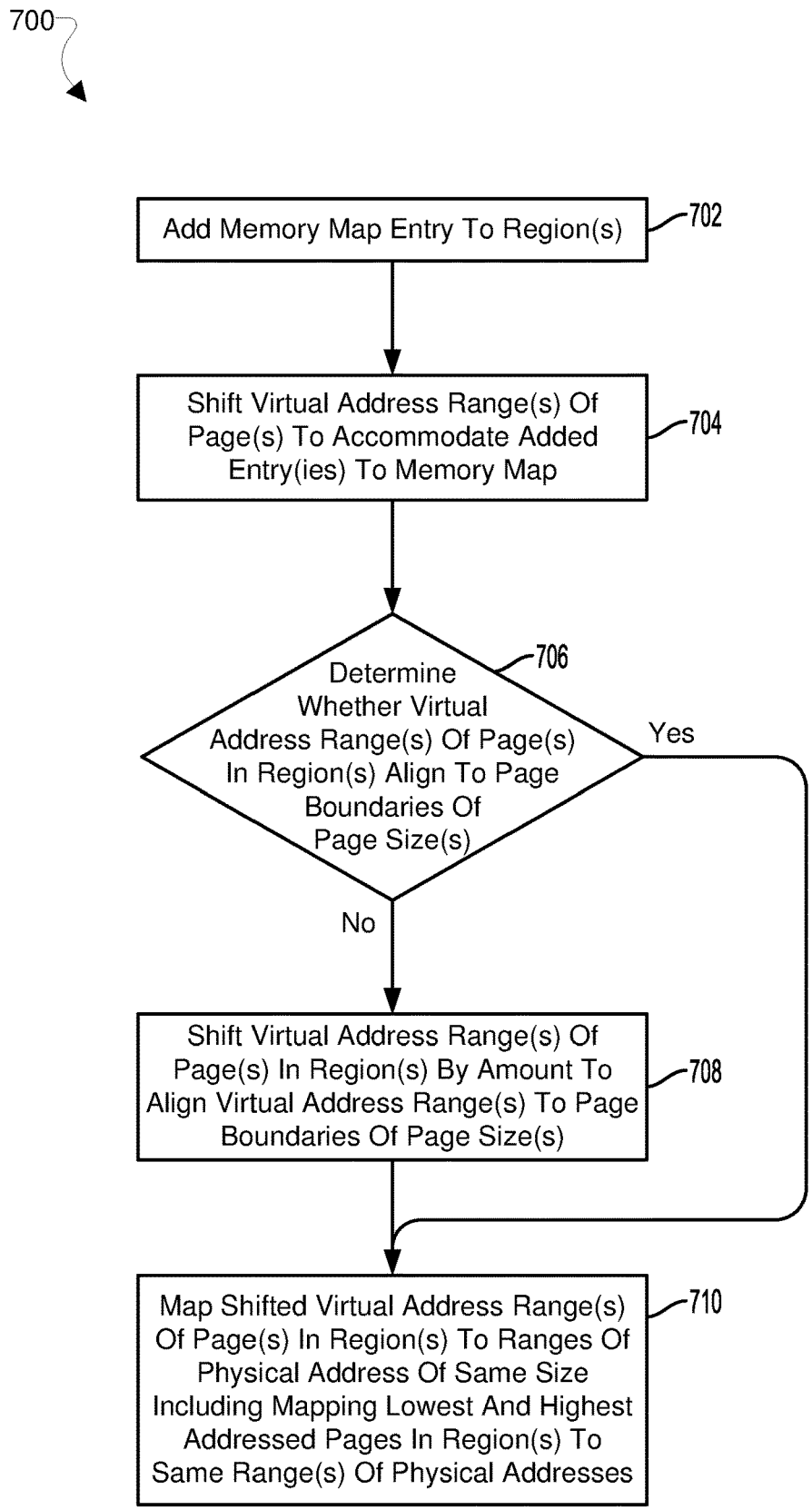
FIG. 7 is a process flow diagram illustrating a method for sub-page granular shift memory mapping according to an embodiment.

FIG. 7 illustrates a method 700 for memory sub-page granular shift memory mapping according to an embodiment. With reference to FIGS. 1-7, the method 700 may be implemented in a computing device (e.g., computing device 100), in hardware (e.g., SoC 102, CPU 104, memory 106, processor 124, memory management unit 206), in software executing in a processor (e.g., memory management unit 206, compiler 504, linker 510, loader 516), or in a combination of a software-configured processor and dedicated hardware (e.g., memory system 200, memory management unit 206, sub-page granular shift memory mapping and rotation system 500) that includes other individual components, and various memory/cache controllers. In order to encompass the alternative configurations enabled in various embodiments, the hardware implementing the method 700 is referred to herein as an "memory control device."

In block 702, the memory control device may add a memory map entry to a region(s) of a memory map (e.g., memory map 400*a*). The memory map may include regions of virtual addresses for pages of a same size. In other words, each region may include virtual addresses for a single size of pages. The memory map may be generated based on a received source code (e.g., source code 502) in a manner for using virtual memory (e.g., virtual memory 202, virtual memory 300) mapped to physical memory (e.g., memory 106, physical memory 208, physical memory 320, physical memory 522) to execute the source code. The memory control device may add an entry for a page to each region of the memory map of the appropriate page size for the region. The entry for a region may include virtual addresses of the page contiguous to the region. The virtual addresses for the page of the entry for a region may be mapped to a same range of physical addresses of a lowest virtually addressed page of an entry for the region. In some embodiments, the memory control device adding the memory map entry to the region(s) of the memory map in block 702 may be a processor, a CPU, a memory management unit, and/or a compiler.

In block 704, the memory control device may shift the virtual address range(s) of the page(s) of the memory map to accommodate the added entry or entries to the memory map. Adding an entry to a region of the memory map may result in the virtual addresses of the added entry overlapping with the virtual addresses of another region of the memory map. The memory control device may shift any number and combination of regions of the memory map to avoid overlapping virtual addresses between regions of the memory map. In some embodiments, the memory control device shifting the virtual address range(s) of the page(s) of the memory map to accommodate the added entry or entries to the memory map in block 704 may be a processor, a CPU, a memory management unit, and/or a compiler.

In determination block 706, the memory control device may determine whether the virtual address range(s) of the page(s) in the region(s) align to page boundaries of a corresponding page size(s). Different regions of the memory map may have different page sizes, and the pages of the regions may align with boundaries for the page sizes as recognized by various software, firmware, and/or hardware. To maintain functionality after shifting the virtual address range(s) of the page(s) of the memory map to accommodate the added entry or entries to the memory map in block 704, the memory control device may ensure alignment of the virtual address range(s) of the page(s) in the region(s) to page boundaries of the corresponding page size(s). For example, the memory control device may compare the virtual addresses of the regions and/or the pages to known page boundaries of the corresponding page size(s). For another example, the memory control device may compare the virtual addresses of the regions and/or the pages to calculated page boundaries of the corresponding page size(s), such to as multiples of known or page boundaries prior to the shifting in block 704. In some embodiments, the memory control device determining whether the virtual address range(s) of the page(s) in the region(s) align to page boundaries of the corresponding page size(s) in determination block 706 may be a processor, a CPU, a memory management unit, and/or a compiler.

In response to determining that the virtual address range(s) of the page(s) in the region(s) do not align to page boundaries of the corresponding page size(s) (i.e., determination block 706="No"), the memory control device may shift the virtual address range(s) of the page(s) in the region(s) by an amount to align the virtual address range(s) to the page boundaries of the corresponding page size(s) in block 708. The comparison in determination block 706 may provide an amount by which the virtual address range(s) of the page(s) in the region(s) do not align to page boundaries of the corresponding page size(s). The memory control device may shift the virtual address range(s) of the page(s) in the region(s) by the amount to align the virtual address range(s) to the page boundaries of the corresponding page size(s). In some embodiments, the memory control device shifting the virtual address range(s) of the page(s) in the region(s) by the amount to align the virtual address range(s) to the page boundaries of the corresponding page size(s) in block 708 may be a processor, a CPU, a memory management unit, and/or a compiler.

In some embodiments, determination block 706 and block 708 may be implemented recursively for successive regions of the memory map. For example, each successive region in the memory map may be shifted when a previous region is shifted. Once the previous region is aligned to the boundaries for the corresponding page size, the memory control device may implement determination block 706 and block 708 for a successive region. The recursive implementation of determination block 706 and block 708 may continue until a last region of the memory map is aligned to the boundaries for the corresponding page size.

In response to determining that the virtual address range(s) of the page(s) in the region(s) do align to page boundaries of the corresponding page size(s) (i.e., determination block 706="Yes"), or following shifting the virtual address range(s) of the page(s) in the region(s) by an amount to align the virtual address range(s) to the page boundaries of the corresponding page size(s) in block 708, the memory control device may map the shifted virtual address range(s) of the page(s) in the region(s) to ranges of physical address of a same size as the pages in block 710. Mapping the shifted virtual address range(s) of the page(s) in the region(s) to ranges of physical address of a same size as the pages may include mapping a lowest virtually addressed page and highest virtually addressed page in the region(s) to same range(s) of physical addresses. In some embodiments, the memory control device mapping the shifted virtual address range(s) of the page(s) in the region(s) to ranges of physical address of a same size as the pages in block 710 may be a processor, a CPU, a memory management unit, and/or a compiler.

Figure 8:
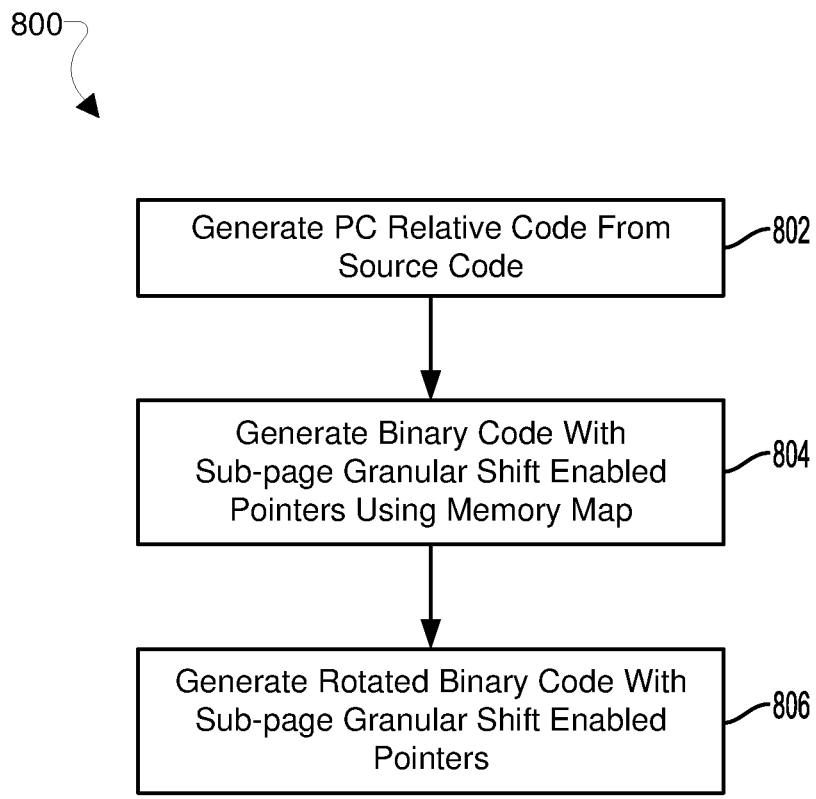
FIG. 8 is a process flow diagram illustrating a method for memory rotation according to an embodiment.

FIG. 8 illustrates a method 800 for memory rotation according to an embodiment. With reference to FIGS. 1-8, the method 800 may be implemented in a computing device (e.g., computing device 100), in hardware (e.g., SoC 102, CPU 104, memory 106, processor 124, memory management unit 206), in software executing in a processor (e.g., memory management unit 206, compiler 504, linker 510, loader 516), or in a combination of a software-configured processor and dedicated hardware (e.g., memory system 200, memory management unit 206, sub-page granular shift memory mapping and rotation system 500) that includes other individual components, and various memory/cache controllers. In order to encompass the alternative configurations enabled in various embodiments, the hardware implementing the method 800 is referred to herein as an "memory control device."

In block 802, the memory control device may generate PC relative code (e.g., PC relative code 508) from source code (e.g., source code 502). In some embodiments, the memory control device generating PC relative code from source code in block 802 may be a processor, a CPU, a memory management unit, and/or a compiler.

In block 804, the memory control device may generate binary code with sub-page granular shift enabled pointers (e.g., binary code with sub-page granular shift adjusted pointers 514) using a memory map (e.g., memory map 400*b*, memory map 506). The memory map may be the memory map generated in the method 700 as described with reference to FIG. 7. The memory control device may receive the memory map and the PC relative code generated in block 802 as inputs. The memory control device may use the shifts in the virtual addresses from the memory map and the PC relative code to generate binary code with sub-page granular shift adjusted pointers. The memory control device may adjust PC relative offsets using the region specific shifts of the memory map to correctly link between PC relative instructions. The memory control device may convert the adjusted PC relative code to binary code with sub-page granular shift enabled pointers, which may be configured to function regardless of a value of the sub-page granular shift amount of virtual addresses applied to the virtual addresses of the memory map in block 604 of the method 600 as described with reference to FIG. 6. In some embodiments, the memory control device generating binary code with sub-page granular shift enabled pointers using the memory map in block 804 may be a processor, a CPU, a memory management unit, and/or a linker.

In block 806, the memory control device may generate rotated binary code with sub-page granular shift enabled pointers (e.g., rotated binary code with sub-page granular shift enabled pointers 520). The memory control device may receive the memory map and the binary code with sub-page granular shift enabled pointers generated in block 804 as inputs. The memory control device may generate a sub-page granular shift memory map (e.g., memory map 204, memory map 400*b*, sub-page granular shift memory map 518) as in the operations of block 604 of the method 600 as described with reference to FIG. 6. The memory control device may retrieve code from a memory (e.g., memory 106, 114) required for execution of the binary code with sub-page granular shift enabled pointers. The memory control device may use the sub-page granular shift memory map to load and store the code to a physical memory (e.g., memory 106, physical memory 208, physical memory 320, physical memory 522). For example, the memory control device may implement the sub-page granular shift memory rotation of the code in the physical memory according to the virtual memory to physical memory mapping of the sub-page granular shift memory map as in block 606 in the method 600 as described with reference to FIG. 6, and in the method 900 described with reference to FIG. 9. In some embodiments, the memory control device generating rotated binary code with sub-page granular shift enabled pointers in block 806 may be a processor, a CPU, a memory management unit, and/or a loader.

Figure 9:
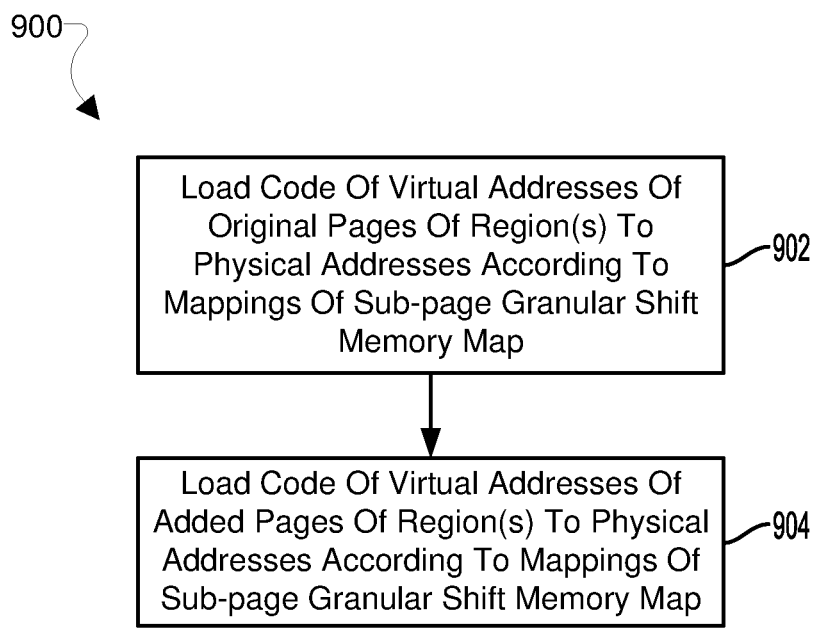
FIG. 9 is a process flow diagram illustrating a method for memory rotation according to an embodiment.

FIG. 9 illustrates a method 900 for described memory rotation according to an embodiment. With reference to FIGS. 1-9, the method 900 may be implemented in a computing device (e.g., computing device 100), in hardware (e.g., SoC 102, CPU 104, memory 106, processor 124, memory management unit 206), in software executing in a processor (e.g., memory management unit 206, compiler 504, linker 510, loader 516), or in a combination of a software-configured processor and dedicated hardware (e.g., memory system 200, memory management unit 206, sub-page granular shift memory mapping and rotation system 500) that includes other individual components, and various memory/cache controllers. In order to encompass the alternative configurations enabled in various embodiments, the hardware implementing the method 900 is referred to herein as an "memory control device."

In block 902, the memory control device may load code of virtual addresses of original page(s) of region(s) to physical addresses according to mappings of sub-page granular shift memory map (e.g., memory map 204, memory map 400b, sub-page granular shift memory map 518). The memory control device may interpret mappings of the sub-page granular shift memory map for rotated binary code with sub-page granular shift enabled pointers (e.g., rotated binary code with sub-page granular shift enabled pointers 520), as generated in block 806 in the method 800 as described with reference to FIG. 8. For example, the memory control device may interpret virtual address to physical address mappings of page(s) of region(s) other than the page(s) added to region(s) in block 702 of the method 700 as described with reference to FIG. 7. The page(s) may have virtual addresses that are shifted and mapped to contiguous and increasing physical addresses. The physical addresses to which the virtual addresses of the original page(s) are mapped may be shifted by an amount of addresses or address space of a sub-page granule shift. The memory control device loading the code of the virtual addresses of the original page(s) of the region(s) to the physical addresses according to the mappings of the sub-page granular shift memory map in block 902 may be a processor, a CPU, a memory management unit, and/or a loader.

In block 904, the memory control device load code of virtual addresses of added page(s) of region(s) to physical addresses according to mappings of sub-page granular shift memory map. The memory control device may further interpret mappings of the sub-page granular shift memory map for the rotated binary code with sub-page granular shift enabled pointers. For example, the memory control device may interpret virtual address to physical address mappings of added page(s) of region(s) in block 702 of the method 700 as described with reference to FIG. 7. The page(s) may have virtual addresses that are shifted and mapped to physical addresses overlapping physical addresses of a lowest virtually addressed page(s) of the region(s). The physical addresses to which the virtual addresses of the added page(s) are mapped may be physical addresses left empty by the shift of the physical addresses by an amount of addresses or address space of the sub-page granule shift. The memory control device loading code of the virtual addresses of the added page(s) of region(s) to the physical addresses according to the mappings of the sub-page granular shift memory map in block 904 may be a processor, a CPU, a memory management unit, and/or a loader.

Figure 10:
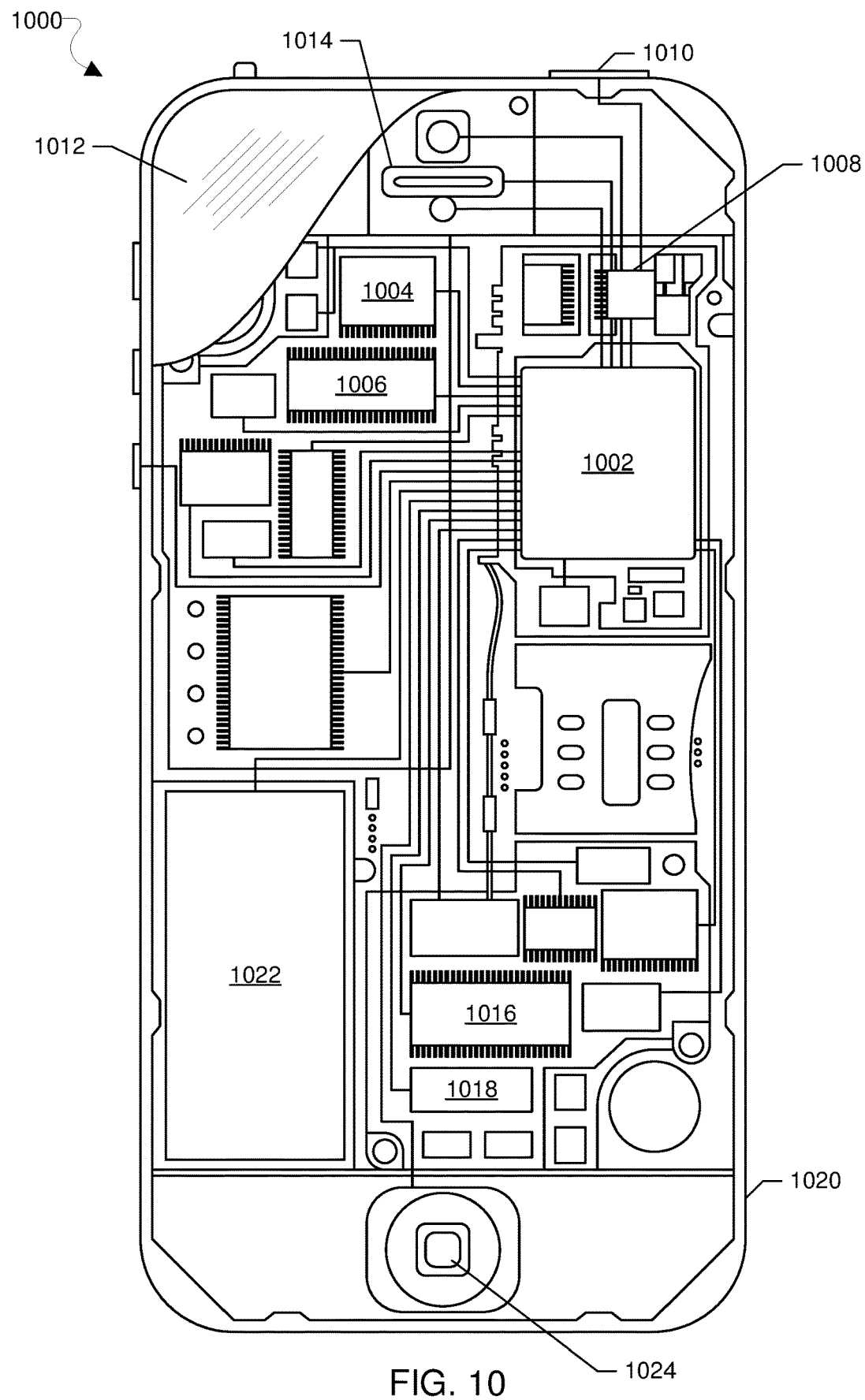
FIG. 10 is a component block diagram illustrating an example mobile computing device suitable for implementing the various embodiments.

A system in accordance with the various embodiments (including, but not limited to, embodiments described above with reference to FIGS. 1-9) may be implemented in a wide variety of computing systems including mobile computing devices, an example of which suitable for use with the various embodiments is illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the mobile computing device 1000 need not have touch screen capability.

The mobile computing device 1000 may have one or more radio signal transceivers 1008 (e.g., Peanut, Bluetooth, ZigBee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as Universal Serial Bus (USB), FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components described herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1024 for turning the mobile computing device 1000 on and off.

Figure 11:
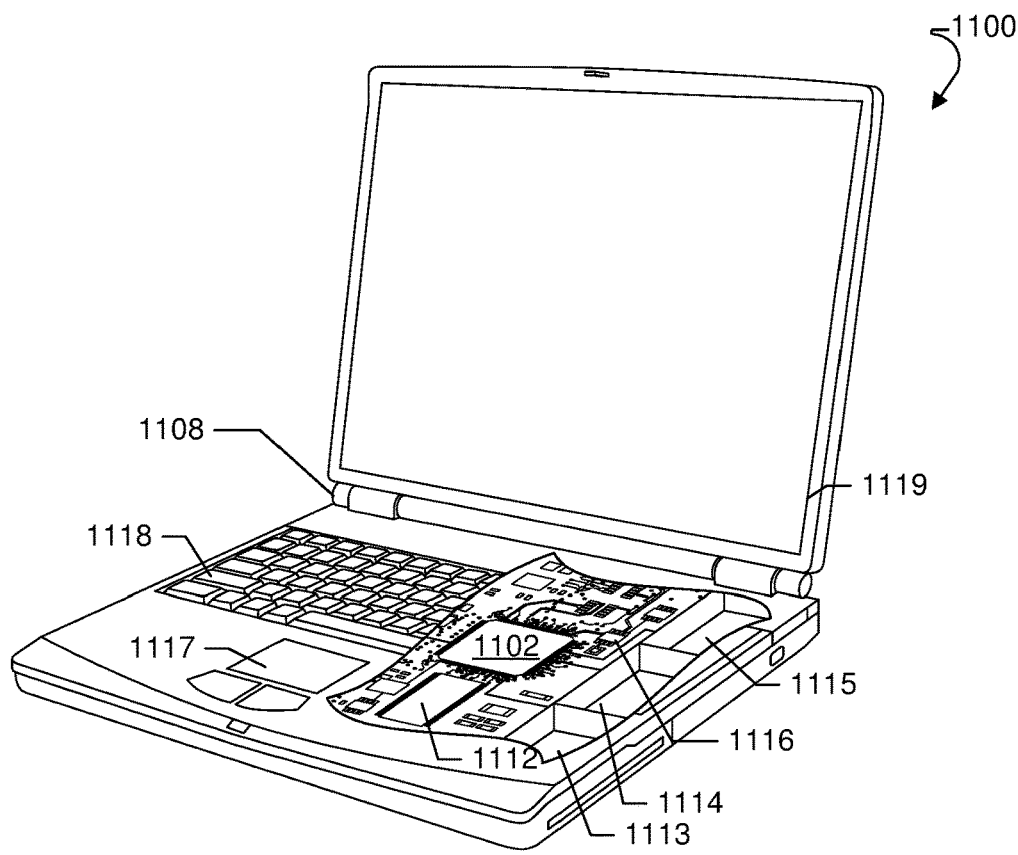
FIG. 11 is a component block diagram illustrating an example mobile computing device suitable for implementing the various embodiments.

A system in accordance with the various embodiments (including, but not limited to, embodiments described above with reference to FIGS. 1-9) may be implemented in a wide variety of computing systems include a laptop computer 1100 an example of which is illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1102 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1102. The computer 1100 may also include a floppy disc drive 1114 and a compact disc (CD) drive 1115 coupled to the processor 1102. In a notebook configuration, the computer housing includes the touchpad 1117, the keyboard 1118, and the display 1119 all coupled to the processor 1102. Other configurations of the computing device may include a computer mouse or trackball coupled to the processor (e.g., via a USB input) as are well known, which may also be used in conjunction with the various embodiments.

Figure 12:
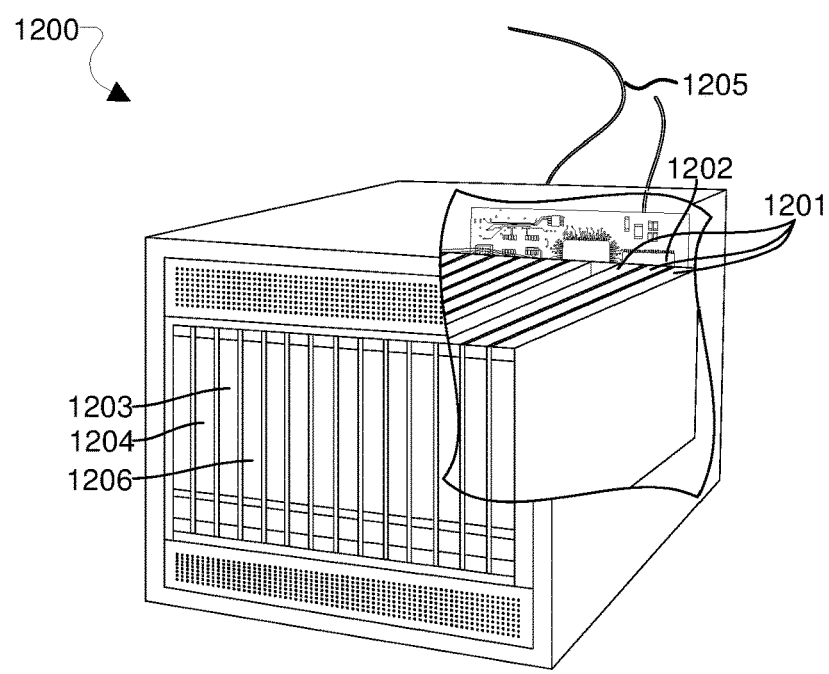
FIG. 12 is a component block diagram illustrating an example server suitable for implementing the various embodiments.

A system in accordance with the various embodiments (including, but not limited to, embodiments described above with reference to FIGS. 1-9) may also be implemented in fixed computing systems, such as any of a variety of commercially available servers. An example server 1200 is illustrated in FIG. 12. Such a server 1200 typically includes one or more multicore processor assemblies 1201 coupled to volatile memory 1202 and a large capacity nonvolatile memory, such as a disk drive 1204. As illustrated in FIG. 12, multicore processor assemblies 1201 may be added to the server 1200 by inserting them into the racks of the assembly. The server 1200 may also include a floppy disc drive, compact disc (CD) or digital versatile disc (DVD) disc drive 1206 coupled to the processor 1201. The server 1200 may also include network access ports 1203 coupled to the multicore processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A method of generating a memory map configured to map virtual addresses of pages to physical addresses, in which pages of a same size are grouped into regions, the method including: adding a first entry for a first additional page to a first region in the memory map; shifting virtual addresses of the first region to accommodate a shift of virtual addresses of the first region allocated for code by a sub-page granular shift amount; mapping shifted virtual addresses of the first entry for the first additional page to physical address mapped to a first lowest shifted virtually addressed page of the first region; and shifting the virtual addresses of the first region allocated for code by a sub-page granular shift amount, in which the virtual addresses of the first region allocated for code partially shift into the first entry for the first additional page.

Example 2. The method of example 1, further including adding a second entry for a second additional page to a second region in the memory map, in which the second region is virtually addressed higher than the first region, shifting virtual addresses of the second region to accommodate a shift of virtual addresses of the second region allocated for code by the sub-page granular shift amount, mapping shifted virtual addresses of the second entry for the second additional page to physical address mapped to a second lowest shifted virtually addressed page of the second region, and shifting the virtual addresses of the second region allocated for code by the sub-page granular shift amount, in which the virtual addresses of the second region allocated for code partially shift into the second entry for the second additional page.

Example 3. The method of any of examples 1 or 2, further including shifting the virtual addresses of the second region to accommodate the first entry added to the first region in the memory map, and shifting the virtual addresses of the second region to align the pages of the second region, including the second additional page, with page boundaries for a size page of the pages of the second region.

Example 4. The method of any of examples 1-3, further including rotating the code for the shifted virtual addresses of the first region allocated for code in a physical memory.

Example 5. The method of example 4, in which rotating the code for the shifted virtual addresses of the first region allocated for code in the physical memory includes loading code for the shifted virtual addresses of the first region allocated for code from the first lowest virtually addressed page to the mapped physical addresses, and loading code for the shifted virtual addresses of the first region allocated for code from the first additional page to the mapped physical addresses, in which the mapped physical addresses for the shifted virtual addresses of the first region allocated for code from the first additional page are lower physical addresses than the mapped physical addresses for the shifted virtual addresses of the first region allocated for code from the first lowest virtually addressed page.

Example 6. The method of any of examples 1-5, further including adjusting pointers for a binary code comprising the code by an amount of the shift of the virtual addresses of the second region to accommodate the shift of virtual addresses of the second region allocated for the code by the sub-page granular shift amount.

Example 7. The method of example 6, further including generating program counter relative code, and generating the binary code from the program counter relative code.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory. CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of generating a memory map configured to map virtual addresses of pages to physical addresses, wherein pages of a same size are grouped into regions, the method comprising:

adding a first entry for a first additional page to a first region in the memory map;
shifting virtual addresses of the first region to accommodate a shift of virtual addresses of the first region allocated for code by a sub-page granular shift amount;
mapping shifted virtual addresses of the first entry for the first additional page to physical address mapped to a first lowest shifted virtually addressed page of the first region; and
shifting the virtual addresses of the first region allocated for code by a sub-page granular shift amount, wherein the virtual addresses of the first region allocated for code partially shift into the first entry for the first additional page.

2. The method of claim 1, further comprising:
adding a second entry for a second additional page to a second region in the memory map, wherein the second region is virtually addressed higher than the first region;
shifting virtual addresses of the second region to accommodate a shift of virtual addresses of the second region allocated for code by the sub-page granular shift amount;
mapping shifted virtual addresses of the second entry for the second additional page to physical address mapped to a second lowest shifted virtually addressed page of the second region; and
shifting the virtual addresses of the second region allocated for code by the sub-page granular shift amount, wherein the virtual addresses of the second region allocated for code partially shift into the second entry for the second additional page.

3. The method of claim 2, further comprising:
shifting the virtual addresses of the second region to accommodate the first entry added to the first region in the memory map; and
shifting the virtual addresses of the second region to align the pages of the second region, including the second additional page, with page boundaries for a size page of the pages of the second region.

4. The method of claim 1, further comprising rotating the code for the shifted virtual addresses of the first region allocated for code in a physical memory.

5. The method of claim 4, wherein rotating the code for the shifted virtual addresses of the first region allocated for code in the physical memory comprises:
loading code for the shifted virtual addresses of the first region allocated for code from the first lowest virtually addressed page to the mapped physical addresses; and
loading code for the shifted virtual addresses of the first region allocated for code from the first additional page to the mapped physical addresses, wherein the mapped physical addresses for the shifted virtual addresses of the first region allocated for code from the first additional page are lower physical addresses than the mapped physical addresses for the shifted virtual addresses of the first region allocated for code from the first lowest virtually addressed page.

6. The method of claim 1, further comprising adjusting pointers for a binary code comprising the code by an amount of the shift of the virtual addresses of the first region to accommodate the shift of virtual addresses of the first region allocated for the code by the sub-page granular shift amount.

7. The method of claim 6, further comprising:
generating program counter relative code; and
generating the binary code from the program counter relative code.

8. A computing device, comprising a processing device configured to:
add a first entry for a first additional page to a first region in a memory map, wherein the memory map is configured to map virtual addresses of pages to physical addresses, and wherein pages of a same size are grouped into regions including the first region;
shift virtual addresses of the first region to accommodate a shift of virtual addresses of the first region allocated for code by a sub-page granular shift amount;
map shifted virtual addresses of the first entry for the first additional page to physical address mapped to a first lowest shifted virtually addressed page of the first region; and
shift the virtual addresses of the first region allocated for code by a sub-page granular shift amount, wherein the virtual addresses of the first region allocated for code partially shift into the first entry for the first additional page.

9. The computing device of claim 8, wherein the processing device is configured to:
add a second entry for a second additional page to a second region in the memory map, wherein the second region is virtually addressed higher than the first region;
shift virtual addresses of the second region to accommodate a shift of virtual addresses of the second region allocated for code by the sub-page granular shift amount;
map shifted virtual addresses of the second entry for the second additional page to physical address mapped to a second lowest shifted virtually addressed page of the second region; and
shift the virtual addresses of the second region allocated for code by the sub-page granular shift amount, wherein the virtual addresses of the second region allocated for code partially shift into the second entry for the second additional page.

10. The computing device of claim 9, wherein the processing device is configured to:
shift the virtual addresses of the second region to accommodate the first entry added to the first region in the memory map; and
shift the virtual addresses of the second region to align the pages of the second region, including the second additional page, with page boundaries for a size page of the pages of the second region.

11. The computing device of claim 8, wherein the processing device is configured to rotate the code for the shifted virtual addresses of the first region allocated for code in a physical memory.

12. The computing device of claim 11, wherein the processing device is configured to rotate the code for the shifted virtual addresses of the first region allocated for code in the physical memory by:
loading code for the shifted virtual addresses of the first region allocated for code from the first lowest virtually addressed page to the mapped physical addresses; and
loading code for the shifted virtual addresses of the first region allocated for code from the first additional page to the mapped physical addresses, wherein the mapped physical addresses for the shifted virtual addresses of the first region allocated for code from the first additional page are lower physical addresses than the mapped physical addresses for the shifted virtual addresses of the first region allocated for code from the first lowest virtually addressed page.

13. The computing device of claim 8, wherein the processing device is configured to adjust pointers for a binary code comprising the code by an amount of the shift of the virtual addresses of the first region to accommodate the shift of virtual addresses of the first region allocated for the code by the sub-page granular shift amount.

14. The computing device of claim 13, wherein the processing device is configured to:
generate program counter relative code; and
generate the binary code from the program counter relative code.

15. A computing device, comprising:
means for adding a first entry for a first additional page to a first region in a memory map, wherein the memory map is configured to map virtual addresses of pages to physical addresses, and wherein pages of a same size are grouped into regions including the first region;
means for shifting virtual addresses of the first region to accommodate a shift of virtual addresses of the first region allocated for code by a sub-page granular shift amount;
means for mapping shifted virtual addresses of the first entry for the first additional page to physical address mapped to a first lowest shifted virtually addressed page of the first region; and
means for shifting the virtual addresses of the first region allocated for code by a sub-page granular shift amount, wherein the virtual addresses of the first region allocated for code partially shift into the first entry for the first additional page.

16. The computing device of claim 15, further comprising:
means for adding a second entry for a second additional page to a second region in the memory map, wherein the second region is virtually addressed higher than the first region;
means for shifting virtual addresses of the second region to accommodate a shift of virtual addresses of the second region allocated for code by the sub-page granular shift amount;
means for mapping shifted virtual addresses of the second entry for the second additional page to physical address mapped to a second lowest shifted virtually addressed page of the second region; and
means for shifting the virtual addresses of the second region allocated for code by the sub-page granular shift amount, wherein the virtual addresses of the second region allocated for code partially shift into the second entry for the second additional page.

17. The computing device of claim 16, further comprising:
means for shifting the virtual addresses of the second region to accommodate the first entry added to the first region in the memory map; and
means for shifting the virtual addresses of the second region to align the pages of the second region, including the second additional page, with page boundaries for a size page of the pages of the second region.

18. The computing device of claim 15, further comprising means for rotating the code for the shifted virtual addresses of the first region allocated for code in a physical memory.

19. The computing device of claim 18, wherein means for rotating the code for the shifted virtual addresses of the first region allocated for code in the physical memory comprises:

means for loading code for the shifted virtual addresses of the first region allocated for code from the first lowest virtually addressed page to the mapped physical addresses; and means for loading code for the shifted virtual addresses of the first region allocated for code from the first additional page to the mapped physical addresses, wherein the mapped physical addresses for the shifted virtual addresses of the first region allocated for code from the first additional page are lower physical addresses than the mapped physical addresses for the shifted virtual addresses of the first region allocated for code from the first lowest virtually addressed page.

20. The computing device of claim 15, further comprising means for adjusting pointers for a binary code comprising the code by an amount of the shift of the virtual addresses of the first region to accommodate the shift of virtual addresses of the first region allocated for the code by the sub-page granular shift amount.

21. The computing device of claim 20, further comprising:

means for generating program counter relative code; and
means for generating the binary code from generated program counter relative code.

22. A non-transitory processor-readable medium having stored thereon processor-executable instructions configured to cause a processing device to perform operations comprising:

adding a first entry for a first additional page to a first region in a memory map, wherein the memory map is configured to map virtual addresses of pages to physical addresses, and wherein pages of a same size are grouped into regions including the first region;

shifting virtual addresses of the first region to accommodate a shift of virtual addresses of the first region allocated for code by a sub-page granular shift amount;

mapping shifted virtual addresses of the first entry for the first additional page to physical address mapped to a first lowest shifted virtually addressed page of the first region; and shifting the virtual addresses of the first region allocated for code by a sub-page granular shift amount, wherein the virtual addresses of the first region allocated for code partially shift into the first entry for the first additional page.

23. The non-transitory processor-readable medium of claim 22, wherein the stored processor-executable instructions are configured to cause the processing device to perform operations further comprising:

adding a second entry for a second additional page to a second region in the memory map, wherein the second region is virtually addressed higher than the first region;

shifting virtual addresses of the second region to accommodate a shift of virtual addresses of the second region allocated for code by the sub-page granular shift amount;

mapping shifted virtual addresses of the second entry for the second additional page to physical address mapped to a second lowest shifted virtually addressed page of the second region; and shifting the virtual addresses of the second region allocated for code by the sub-page granular shift amount, wherein the virtual addresses of the second region allocated for code partially shift into the second entry for the second additional page.

24. The non-transitory processor-readable medium of claim 23, wherein the stored processor-executable instructions are configured to cause the processing device to perform operations further comprising:

shifting the virtual addresses of the second region to accommodate the first entry added to the first region in the memory map; and shifting the virtual addresses of the second region to align the pages of the second region, including the second additional page, with page boundaries for a size page of the pages of the second region.

25. The non-transitory processor-readable medium of claim 22, wherein the stored processor-executable instructions are configured to cause the processing device to perform operations further comprising rotating the code for the shifted virtual addresses of the first region allocated for code in a physical memory.

26. The non-transitory processor-readable medium of claim 25, wherein the stored processor-executable instructions are configured to cause the processing device to perform operations such that rotating the code for the shifted virtual addresses of the first region allocated for code in the physical memory comprises:

loading code for the shifted virtual addresses of the first region allocated for code from the first lowest virtually addressed page to the mapped physical addresses; and loading code for the shifted virtual addresses of the first region allocated for code from the first additional page to the mapped physical addresses, wherein the mapped physical addresses for the shifted virtual addresses of the first region allocated for code from the first additional page are lower physical addresses than the mapped physical addresses for the shifted virtual addresses of the first region allocated for code from the first lowest virtually addressed page.

27. The non-transitory processor-readable medium of claim 22, wherein the stored processor-executable instructions are configured to cause the processing device to perform operations further comprising adjusting pointers for a binary code comprising the code by an amount of the shift of the virtual addresses of the first region to accommodate the shift of virtual addresses of the first region allocated for the code by the sub-page granular shift amount.

28. The non-transitory processor-readable medium of claim 27, wherein the stored processor-executable instructions are configured to cause the processing device to perform operations further comprising:

generating program counter relative code; and
generating the binary code from the program counter relative code.

* * * * *